(12) United States Patent
Saito et al.

(10) Patent No.: US 8,546,036 B2
(45) Date of Patent: Oct. 1, 2013

(54) FUEL CELL AND FUEL CELL STACK

(75) Inventors: Bunichi Saito, Wako (JP); Yukihiko Kiyohiro, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 628 days.

(21) Appl. No.: 12/681,546

(22) PCT Filed: Sep. 24, 2008

(86) PCT No.: PCT/JP2008/067776
§ 371 (c)(1),
(2), (4) Date: Apr. 2, 2010

(87) PCT Pub. No.: WO2009/044752
PCT Pub. Date: Apr. 9, 2009

(65) Prior Publication Data
US 2011/0189576 A1 Aug. 4, 2011

(30) Foreign Application Priority Data
Oct. 4, 2007 (JP) .................................. 2007-261319

(51) Int. Cl.
*H01M 2/38* (2006.01)
(52) U.S. Cl.
USPC ............ 429/455; 429/454; 429/452; 429/400
(58) Field of Classification Search
USPC ........................................................ 429/455
See application file for complete search history.

(56) References Cited

U.S. PATENT DOCUMENTS

| 7,556,878 B2 | 7/2009 | Ibuka et al. |
| 2009/0098439 A1* | 4/2009 | Homma ......................... 429/34 |

FOREIGN PATENT DOCUMENTS

| EP | 0706229 A2 | 4/1996 |
| JP | 2004-235060 | 8/2004 |
| JP | 2006-302749 | 11/2006 |
| WO | 2004-059771 A2 | 7/2004 |
| WO | 2006/043729 A2 | 4/2006 |
| WO | 2006/049308 A2 | 5/2006 |
| WO | 2006/123797 A1 | 11/2006 |
| WO | WO 2006123797 A1 * | 11/2006 |
| WO | 2007/074666 A1 | 7/2007 |

OTHER PUBLICATIONS

International Search Report for Application No. PCT/JP2008/067776, dated May 13, 2009.

* cited by examiner

*Primary Examiner* — Barbara Gilliam
*Assistant Examiner* — Gary Harris
(74) *Attorney, Agent, or Firm* — Nelson Mullins Riley & Scarborough LLP; Anthony A. Laurentano

(57) ABSTRACT

A fuel cell includes separators sandwiching electrolyte electrode assemblies. Each of the separators includes a fuel gas supply section, four first bridges extending radially outwardly from the fuel gas supply section, sandwiching sections connected to the first bridges, and flow rectifier members provided between adjacent sandwiching sections. A fuel gas supply passage extends through the center of the fuel gas supply section. Each of the sandwiching sections has a fuel gas channel and an oxygen-containing gas channel. The flow rectifier members rectify the flow of the oxygen-containing gas supplied from the oxygen-containing gas supply passage to the electrolyte electrode assemblies.

14 Claims, 19 Drawing Sheets

L1>L2

L3<L4

- - → FUEL GAS
— → OXYGEN-CONTAINING GAS

US 8,546,036 B2

FUEL CELL AND FUEL CELL STACK

RELATED APPLICATIONS

This application is a 35 U.S.C. 371 national stage filing of International Application No. PCT/JP2008/067776 filed on Sep. 24, 2008, which claims priority to Japanese Patent Application No. 2007-261319 filed on Oct. 4, 2007 in Japan. The contents of the aforementioned applications are hereby incorporated by reference.

TECHNICAL FIELD

The present invention relates to a fuel cell formed by stacking electrolyte electrode assemblies between separators. Each of the electrolyte electrode assemblies includes an anode, a cathode, and an electrolyte interposed between the anode and the cathode. Further, the present invention relates to a fuel cell stack formed by stacking a plurality of the fuel cells.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly (MEA). The electrolyte electrode assembly is interposed between separators (bipolar plates). In use, generally, predetermined numbers of the electrolyte electrode assemblies and the separators are stacked together to form a fuel cell stack.

In the fuel cell of this type, Japanese Laid-Open Patent Publication No. 2004-235060 discloses a fuel cell having an object of achieving the uniform gas flow distribution of the air and fuel supplied to the cells, and uniform distribution of the heat or stress generated in the cells.

In the conventional technique, as shown in FIG. 18, a cell forming plate 1a is provided. At the axial center of a solid electrolyte substrate 2a, a ring shaped member 4a having a central through hole 3a is provided. A gas channel 6a having a plurality of peripheral through holes 5a around the central through holes 3a is formed. According to the disclosure, in the structure, the temperature difference between the outer circumferential region and the central region of the cell is reduced, and the heat stress in the overall cell can be reduced.

Further, in a solid oxide fuel cell disclosed in Japanese Laid-Open Patent Publication No. 2006-302749, as shown in FIG. 19, a porous current collector 3b is provided in a space formed between the separators 1b, 2b. Gases are supplied into, and discharged from the space through gas inlet holes 4b, 5b and gas discharge holes 6b, 7b. The gas inlet hole 4b and gas discharge hole 6b are formed in the separator 1b, and the gas inlet hole 5b and gas discharge hole 7b are formed in the separator 2b. In the porous current collector 3b, a compression band 8b is provided, and the compression band 8b is joined to the separator 2b.

According to the disclosure, in the structure, reduction in the thickness of the separator, and improvement in the strength of the separator are achieved, and positional deviation of the porous current collector from the separator due to vibration or impact can be prevented.

Further, in Japanese Laid-Open Patent Publication No. 2004-235060, since each cell forming plate 1a comprises one electrolyte electrode assembly, if any power generation failure occurs in one of the power generation cells, the failure causes malfunction in power generation of the entire fuel cell. Therefore, power generation cannot be performed efficiently.

Further, since the cell forming plate 1a has a ring shape having the central through hole 3a, the electrolyte electrode assembly also has a ring shape. Therefore, the electrolyte electrode assembly tends to be damaged or cracked easily. Further, it is not possible to suppress radiation of heat generated in the power generation, and heat efficiency is lowered.

Further, in the case of applying the load to the cells in the stacking direction by putting a priority on the sealing performance, the load is directly applied to the electrolyte electrode assembly. By the excessive load applied to the electrolyte electrode assembly, the electrolyte electrode assembly may be damaged or cracked undesirably.

Further, in Japanese Laid-Open Patent Publication No. 2006-302749, one electrolyte electrode assembly is sandwiched between the separators 1b, 2b. In the structure, if any power generation failure occurs in one of the power generation cells, the failure causes malfunction in power generation of the entire fuel cell. Therefore, power generation cannot be performed efficiently.

Further, the electrolyte electrode assembly has a ring shape, and thus, the electrolyte electrode assembly tends to be damaged or cracked easily. Further, it is not possible to suppress radiation of heat generated in the power generation, and heat efficiency is lowered.

Further, in the case of applying the load to the cells in the stacking direction by putting a priority on the sealing performance, the load is directly applied to the electrolyte electrode assembly. By the excessive load applied to the electrolyte electrode assembly, the electrolyte electrode assembly may be damaged or cracked undesirably.

DISCLOSURE OF INVENTION

The present invention has been made to solve the problem of this type, and an object of the present invention is to provide a fuel cell and a fuel cell stack which make it possible to optimize distribution of an oxygen-containing gas supplied to cathodes and distribution of a fuel gas supplied to anodes and to prevent damages or like in electrolyte electrode assemblies, while suppressing radiation of heat generated in power generation so as to improve heat efficiency and facilitate thermally self-sustained operation.

The present invention relates to a fuel cell formed by stacking electrolyte electrode assemblies between separators. Each of the electrolyte electrode assemblies includes an anode, a cathode, and an electrolyte interposed between the anode and the cathode.

Each of the separators includes sandwiching sections, bridges, a first reactant gas supply section, a second reactant gas supply section, and a flow rectifier member. The sandwiching sections sandwich the electrolyte electrode assemblies. Each of the sandwiching sections has a fuel gas channel for supplying a fuel gas along an electrode surface of the anode and an oxygen-containing gas channel for supplying an oxygen-containing gas along an electrode surface of the cathode separately. The bridges are connected to the sandwiching sections. Each of the bridges has a reactant gas supply channel for supplying the fuel gas to the fuel gas channel or supplying the oxygen-containing gas to the oxygen-containing gas channel. The first reactant gas supply section is connected to the bridges. A reactant gas supply passage extends through the first reactant gas supply section in a stacking direction for supplying the fuel gas or the oxygen-containing gas to the reactant gas supply channel. The first reactant gas supply section is provided at the center of the separator. The second reactant gas supply section allows the oxygen-containing gas or the fuel gas to flow in the stacking direction, and supplies the oxygen-containing gas to the oxygen-containing gas channel or supplies the fuel gas to the fuel gas channel. The flow rectifier member is provided between adjacent sandwiching sections, for rectifying the flow of the oxygen-containing gas flowing through the oxygen-containing gas channel or the fuel gas flowing through the fuel gas channel, along a surface of the electrolyte electrode assembly from at least the second reactant gas supply section.

The electrolyte electrode assemblies are arranged concentrically around the first reactant gas supply section, and the flow rectifier member is provided along part of an outer circumferential portion of the sandwiching section and part of a circumscribed circle of the separator.

Further, the present invention relates to a fuel cell stack formed by stacking a plurality of fuel cells in a stacking direction. Each of the fuel cells is formed by stacking electrolyte electrode assemblies between separators.

Each of the electrolyte electrode assemblies includes an anode, a cathode, and an electrolyte interposed between the anode and the cathode. Each of the separators includes sandwiching sections, bridges, a first reactant gas supply section, a second reactant gas supply section, and a flow rectifier member. The sandwiching sections sandwich the electrolyte electrode assemblies. Each of the sandwiching sections has a fuel gas channel for supplying a fuel gas along an electrode surface of the anode and an oxygen-containing gas channel for supplying an oxygen-containing gas along an electrode surface of the cathode separately. The bridges are connected to the sandwiching sections. Each of the bridges has a reactant gas supply channel for supplying the fuel gas to the fuel gas channel or supplying the oxygen-containing gas to the oxygen-containing gas channel. The first reactant gas supply section is connected to the bridges. A reactant gas supply passage extends through the first reactant gas supply section in the stacking direction for supplying the fuel gas or the oxygen-containing gas to the reactant gas supply channel. The first reactant gas supply section is provided at the center of the separator. The second reactant gas supply section allows the oxygen-containing gas or the fuel gas to flow in the stacking direction, and supplies the oxygen-containing gas to the oxygen-containing gas channel or supplies the fuel gas to the fuel gas channel. The flow rectifier member is provided between adjacent sandwiching sections, for rectifying the flow of the oxygen-containing gas flowing through the oxygen-containing gas channel or the fuel gas flowing through the fuel gas channel, along a surface of the electrolyte electrode assembly from at least the second reactant gas supply section.

The electrolyte electrode assemblies are arranged concentrically around the first reactant gas supply section, and the flow rectifier member is provided along part of an outer circumferential portion of the sandwiching section and part of a circumscribed circle of the separator.

In the present invention, since the electrolyte electrode assemblies are arranged concentrically around the first reactant gas supply section, the reactant gases supplied to the fuel cells or the fuel cell stack are suitably heated by heat generated in the power generation. Thus, it is possible to improve the heat efficiency and facilitate the thermally self-sustained operation of the fuel cells or the fuel cell stack. Thermally-self sustained operation herein means operation where the operating temperature of the fuel cells or the fuel cell stack is maintained using only heat energy generated in the fuel cells or the fuel cells stack, without supplying additional heat from the outside.

Further, it is possible to distribute reactant gases from the first reactant gas supply section to the electrolyte electrode assemblies arranged concentrically around the first reactant gas supply section. Thus, improvement and stability in the power generation performance are easily achieved in each of the electrolyte electrode assemblies.

Further, in each space between the adjacent sandwiching sections, the flow rectifier member for rectifying the flow of the oxygen-containing gas flowing through the oxygen-containing gas channel or the fuel gas flowing through the fuel gas channel, along the electrode surface, at least from the second reactant gas supply section is provided. In the structure, the oxygen-containing gas or the fuel gas is supplied locally to the portion of each electrolyte electrode assembly where the supply of the oxygen-containing gas or the fuel gas is required.

For example, when the oxygen-containing gas is supplied to the second reactant gas supply section, the distribution of the oxygen-containing gas supplied to the electrode surface of the cathode is optimized for the distribution of the fuel gas supplied to the electrode surface of the anode. Therefore, it is possible to prevent depletion of the oxygen-containing gas, and to lower the ratio of the air to the fuel gas (A/F), thereby lowering the output of the oxygen-containing gas supply apparatus, and reducing the size of the oxygen-containing gas supply apparatus. Further, since the flow rectifier member is provided outside the sandwiching section, the flow rectifier member does not affect current collection by the sandwiching section.

Further, the flow rectifier member is provided along part of the outer circumferential portion of the sandwiching section and part of the circumscribed circle of the separator. In the structure, the amount of the oxygen-containing gas or the fuel gas flowing from the second oxygen-containing gas supply section to the outside of the sandwiching section is regulated. The flow rectifier member does not protrude from the circumscribed circle of the separator. Thus, the overall size of the fuel cell can be reduced easily. Further, radiation of heat generated in the electrolyte electrode assemblies to the outside of the sandwiching sections is suppressed. Thus, it is possible to improve heat efficiency, and facilitate thermally self-sustained operation.

The above and other objects, features and advantages of the present invention will become more apparent from the following description when taken in conjunction with the accompanying drawings in which preferred embodiments of the present invention are shown by way of illustrative example.

BEST MODE FOR CARRYING OUT THE INVENTION

Figure 1:
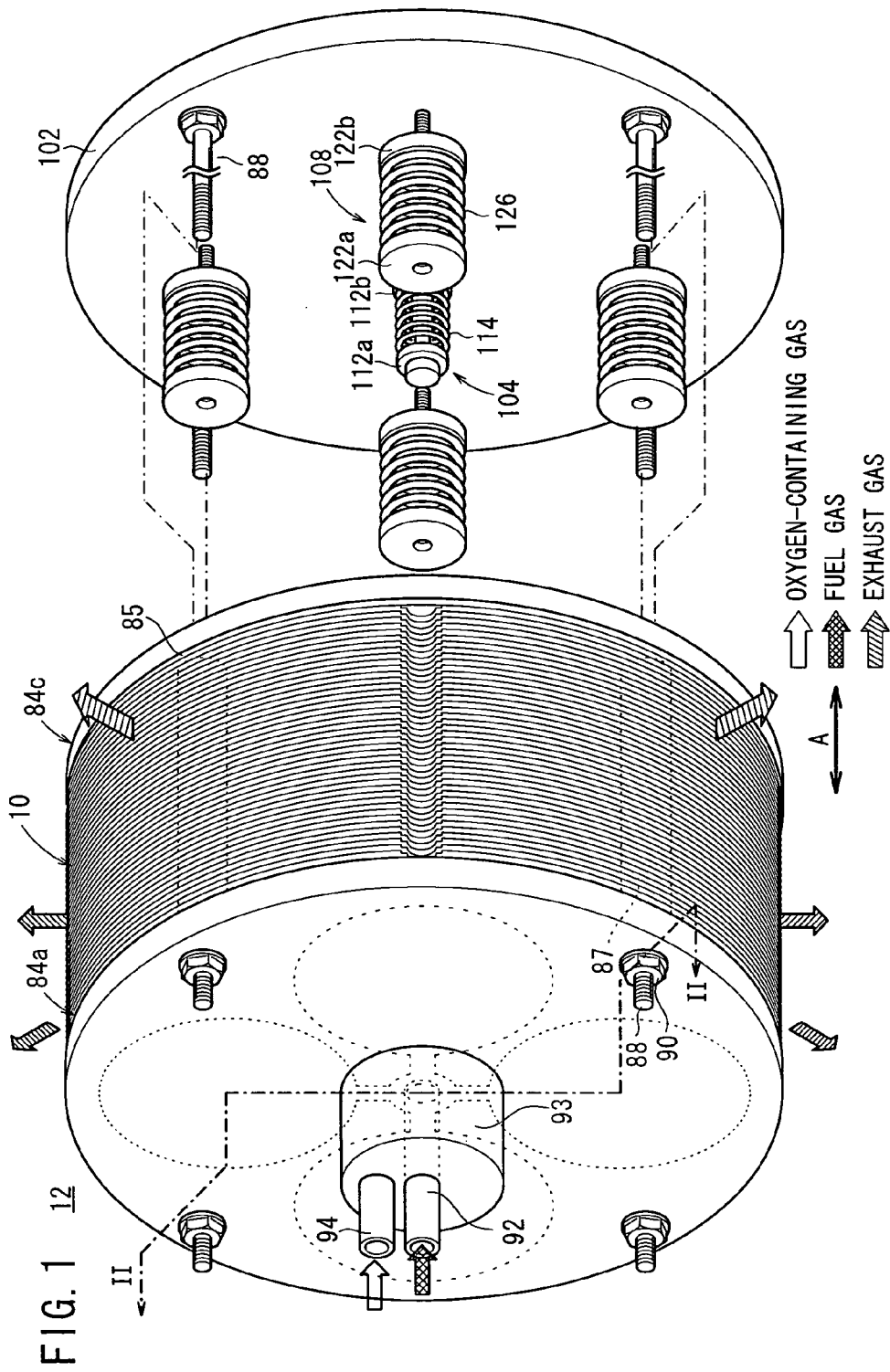
FIG. 1 is a perspective view schematically showing a fuel cell stack formed by stacking fuel cells according to a first embodiment of the present invention.
Figure 2:
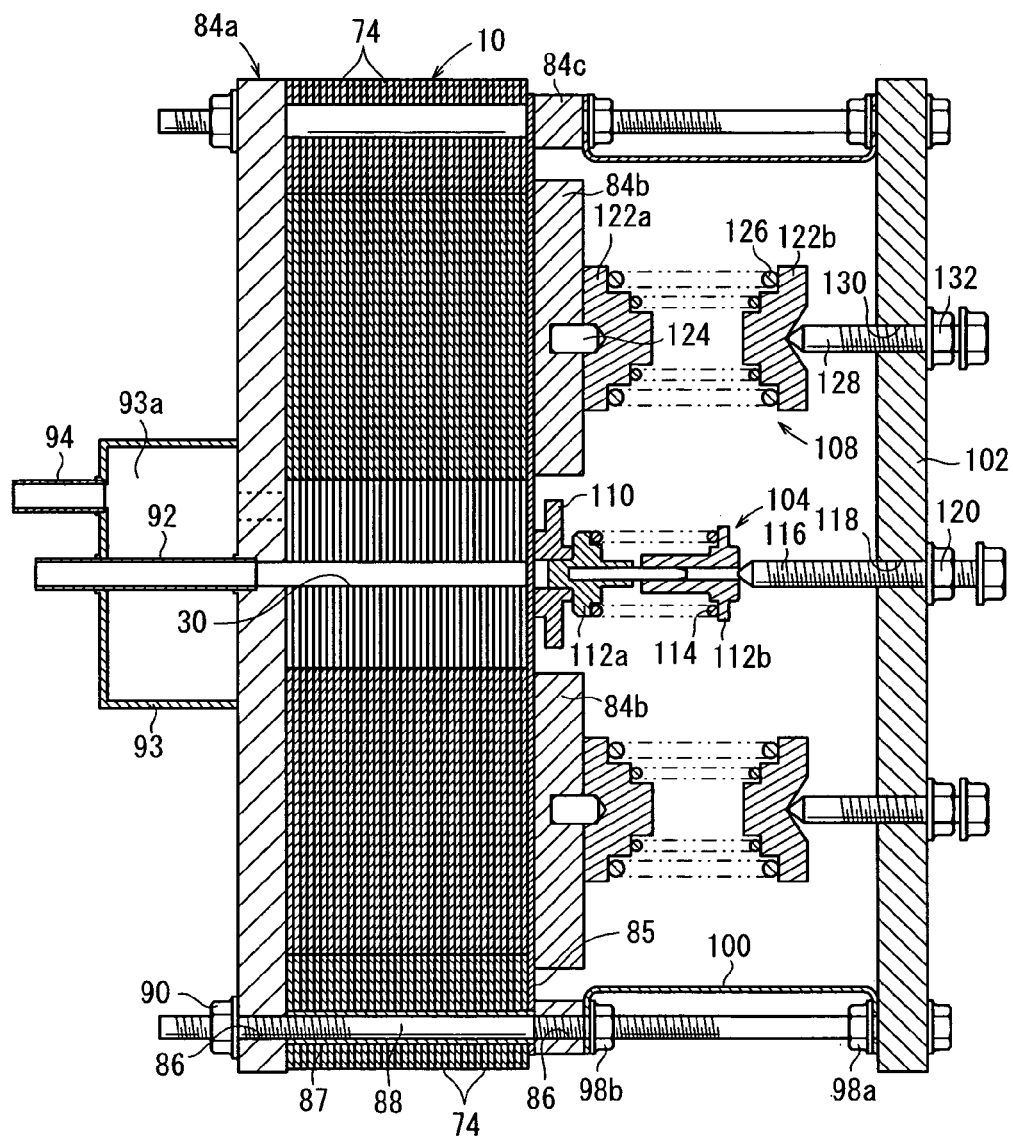
FIG. 2 is a cross sectional view showing the fuel cell stack taken along a line II-II in FIG. 1.

FIG. 1 is a perspective view schematically showing a fuel cell stack 12 formed by stacking fuel cells 10 according to a first embodiment of the present invention in a direction indicated by an arrow A. FIG. 2 is a cross sectional view showing the fuel cell stack 12 taken along a line II-II in FIG. 1.

Figure 3:
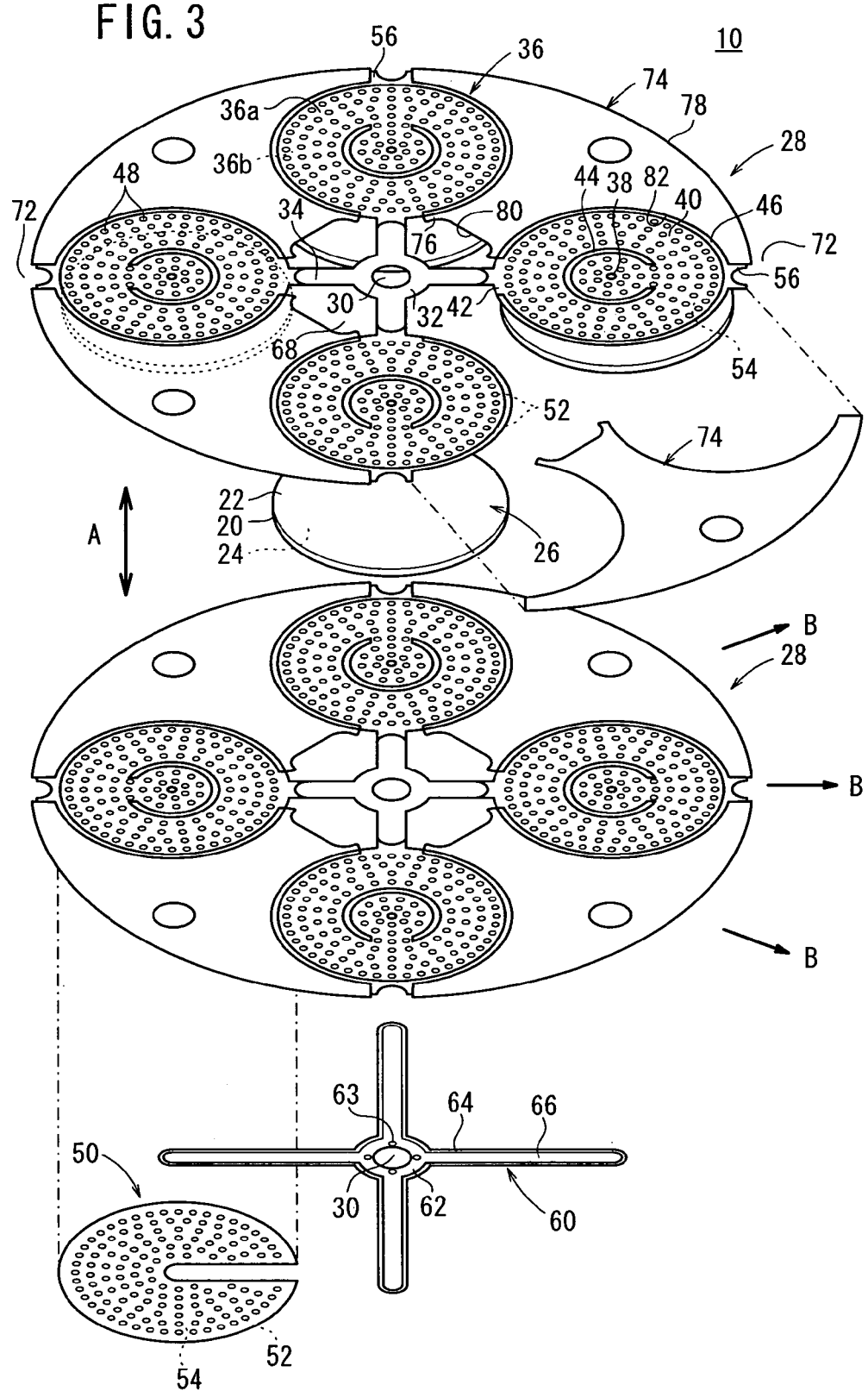
FIG. 3 is an exploded perspective view showing the fuel cell.
Figure 4:
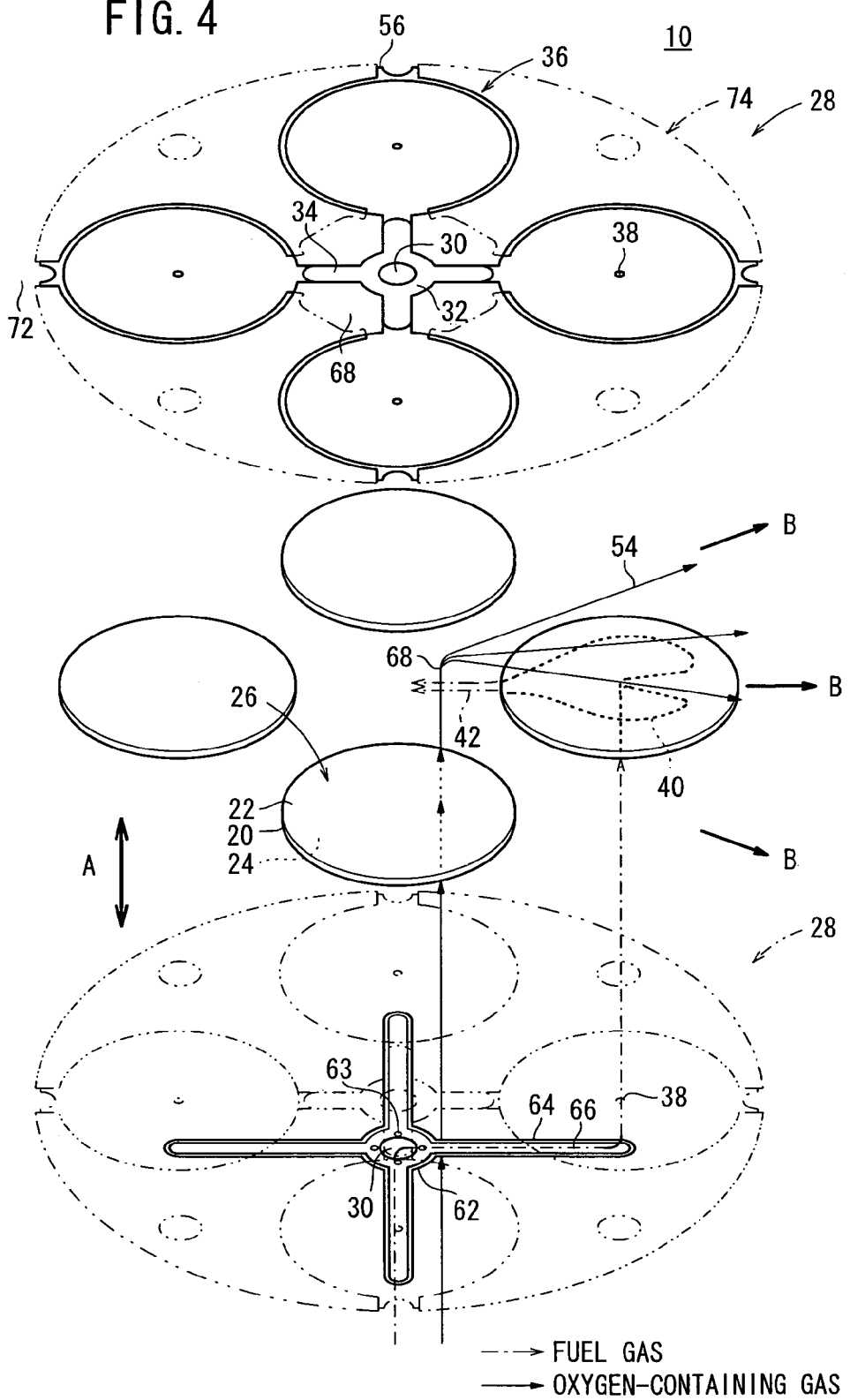
FIG. 4 is a partial exploded perspective view showing gas flows in the fuel cell.

The fuel cell 10 is a solid oxide fuel cell (SOFC) used in various applications, including stationary and mobile applications. For example, the fuel cell 10 is mounted on a vehicle. As shown in FIGS. 3 and 4, the fuel cell 10 includes electrolyte electrode assemblies (MEAs) 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape. A barrier layer (not shown) is provided at least at the outer circumferential edge of the electrolyte electrode assembly 26 for preventing entry or discharge of the oxygen-containing gas and the fuel gas.

The fuel cell 10 is formed by sandwiching four electrolyte electrode assemblies 26 between a pair of separators 28. The four electrolyte electrode assemblies 26 are provided concentrically around a fuel gas supply passage (reactant gas supply passage) 30 extending through the center of the separators 28.

As shown in FIG. 3, each of the separators 28 includes, e.g., one metal plate of stainless alloy etc., or a carbon plate. A fuel gas supply section (first reactant gas supply section) 32 is formed at the center of the separator 28, and the fuel gas supply passage 30 extends through the fuel gas supply section 32. Four first bridges 34 extend radially outwardly from the fuel gas supply section 32 at equal intervals, e.g., 90°. The fuel gas supply section 32 is integral with sandwiching sections 36 each having a relatively large diameter, through the first bridges 34. The centers of sandwiching sections 36 are equally distanced from the center of the fuel gas supply section 32.

Each of the sandwiching sections 36 has a circular disk shape, having substantially the same dimensions as the electrolyte electrode assembly 26. The sandwiching sections 36 are separated from each other. A fuel gas inlet 38 for supplying the fuel gas is formed at the center of the sandwiching section 36, or at an upstream position deviated from the center of the sandwiching section 36 in the flow direction of the oxygen-containing gas.

Each of the sandwiching sections 36 has a fuel gas channel 40 on a surface 36a which contacts the anode 24, for supplying a fuel gas along an electrode surface of the anode 24. Further, a fuel gas discharge channel 42 for discharging the fuel gas consumed in the fuel gas channel 40 and a circular arc wall (detour channel forming wall) 44 forming a detour path to prevent the fuel gas from flowing straight from the fuel gas inlet 38 to the fuel gas discharge channel 42 are provided on the surface 36a of the sandwiching section 36.

The circular arc wall 44 has a substantially horseshoe shape. The fuel gas inlet 38 is provided on a distal end side inside the circular arc wall 44, and the fuel gas discharge channel 42 is provided on a proximal end side of the circular arc wall 44, near the first bridge 34. On the surface 36a, a circumferential protrusion 46 and a plurality of projections 48 are provided. The circumferential protrusion 46 protrudes on a side of the fuel gas channel 40, and contacts the outer edge of the anode 24, and the projections 48 contact the anode 24.

The protrusion 46 has a substantially ring shape with partial cutaway at a position corresponding to the fuel gas discharge channel 42. The projections 48 are made of solid portions formed by, e.g., etching, or hollow portions formed by press forming.

Figure 5:
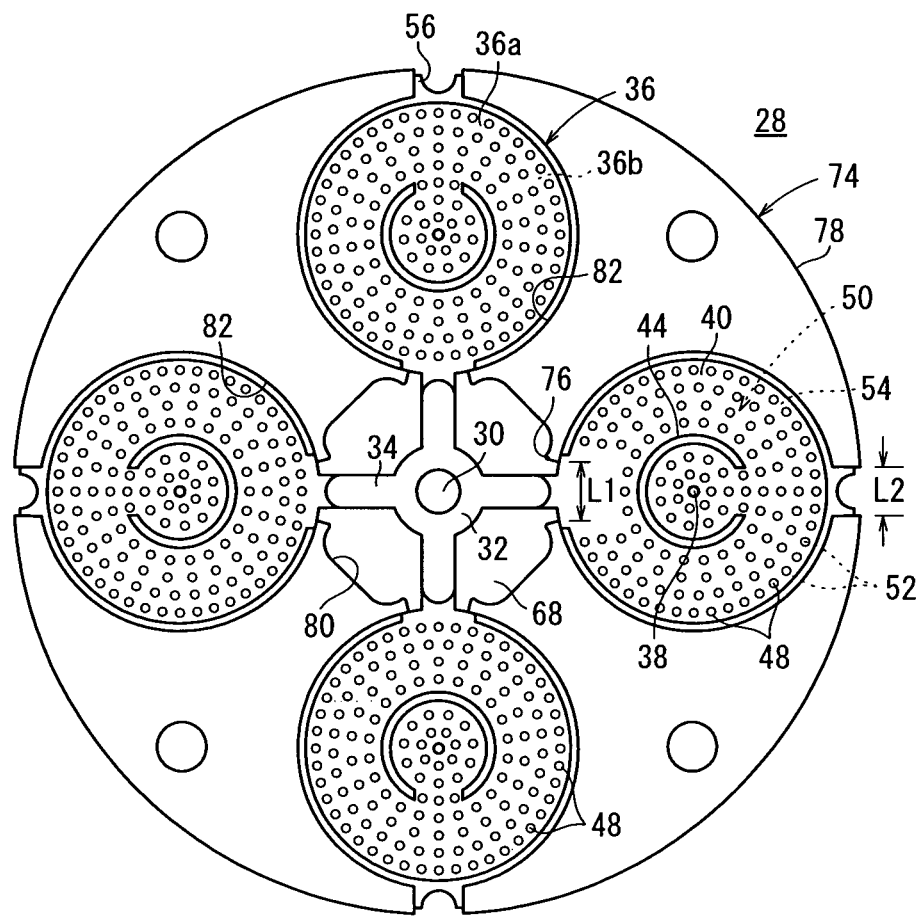
FIG. 5 is a plan view showing a separator of the fuel cell.
Figure 6:
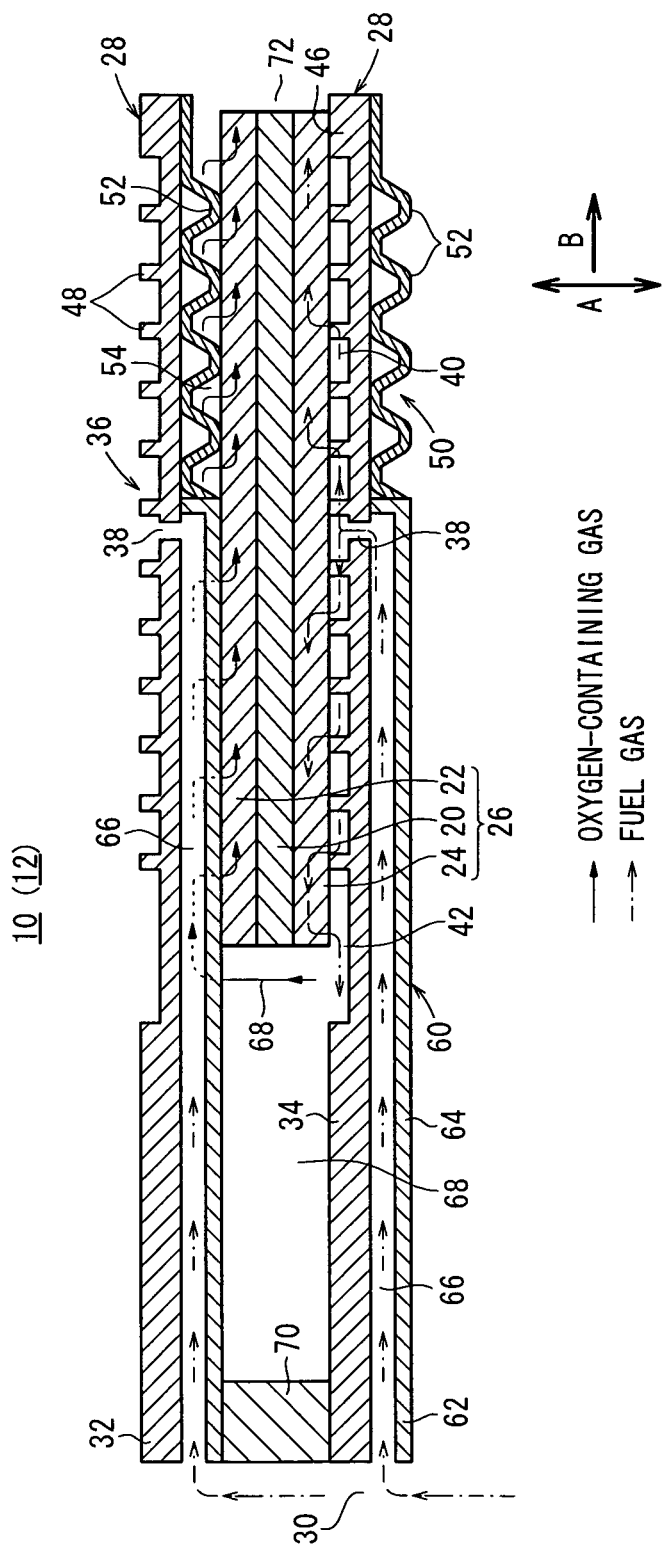
FIG. 6 is a cross sectional view schematically showing operation of the fuel cell.

As shown in FIGS. 5 and 6, each of the sandwiching sections 36 has a substantially planar surface 36b which contacts the cathode 22. A plate 50 having a circular disk shape is fixed to the surface 36b, e.g., by brazing, diffusion bonding, laser welding, or the like. A plurality of projections 52 are provided on the plate 50, e.g., by press forming. By the projections 52, an oxygen-containing gas channel 54 for supplying an oxygen-containing gas along an electrode surface of the cathode 22 is formed. The projections 52 function as a current collector.

Extensions 56 extend from the outer circumferential positions of the sandwiching sections 36. The extensions 56 are used for collecting and measuring electrical energy generated in the fuel cells 10, positioning the fuel cells 10 to the separators 28, and detecting the number of fuel cells 10 (see FIGS. 3 to 5).

As shown in FIG. 3, a channel member 60 is fixed to a surface of the separator 28 facing the cathode 22, e.g., by brazing, diffusion bonding, or laser welding. The channel member 60 has a planar shape. The fuel gas supply passage 30 extends through a fuel gas supply section 62 at the center of the channel member 60. A predetermined number of reinforcement bosses 63 are formed in the fuel gas supply section 62.

Four second bridges 64 extend radially from the fuel gas supply section 62. Each of the second bridges 64 is fixed to the separator 28 from the first bridge 34 to the surface 36b of the sandwiching section 36 to cover the fuel gas inlet 38 (see FIG. 6).

From the fuel gas supply section 62 to the second bridge 64, a fuel gas supply channel (reactant gas supply channel) 66 connecting the fuel gas supply passage 30 to the fuel gas inlet 38 is formed. For example, the fuel gas supply channel 66 is formed by, e.g., etching.

As shown in FIG. 6, the oxygen-containing gas channel 54 is connected to the oxygen-containing gas supply passage (second reactant gas supply section) 68 for supplying the oxygen-containing gas from a space between an inner circumferential edge of the electrolyte electrode assembly 26 and an inner circumferential edge of the sandwiching section 36 in a direction indicated by an arrow B. The oxygen-containing gas supply passage 68 extends inside the sandwiching sections 36 in the stacking direction indicated by the arrow A, between the respective first bridges 34.

An insulating seal 70 for sealing the fuel gas supply passage 30 is provided between the separators 28. For example, crustal component material such as mica material and ceramic material, glass material, and composite material of clay and plastic may be used for the insulating seal 70. The insulating seal 70 seals the fuel gas supply passage 30 from the electrolyte electrode assemblies 26. An exhaust gas channel 72 is provided outside (around) the sandwiching sections 36 of the fuel cells 10.

A flow rectifier member 74 is provided in each space between the adjacent sandwiching sections 36 for rectifying the flow of the oxygen-containing gas supplied from the oxygen-containing gas supply passage 68, and flowing through the oxygen-containing gas channel 54 along the surface of each electrolyte electrode assembly 26 and rectifying the flow of the fuel gas flowing in the fuel gas channel 40 along the surface of each electrolyte electrode assembly 26. The flow rectifier member 74 is a plate having a substantially fan shape. A predetermined number of the flow rectifier members 74 are stacked in the direction indicated by the arrow A. The number of the flow rectifier members 74 in a plan view is four, corresponding to positions between the sandwiching sections 36.

The flow rectifier member 74 is formed by joining an electrically insulating member of, e.g., mica material, with silicone resin. The flow rectifier member 74 is provided along part of the outer edge of the sandwiching section 36 and part of the circumscribed circle of the separator 28. One end 76 of the flow rectifier member 74 along the part of the sandwiching section 36 is provided near the joint positions between the sandwiching sections 36 and the first bridges 34, and an outer circumferential portion 78 as the other end of the flow rectifier member 74 form part of the circumscribed circle of the separator 28.

The one end 76 of the flow rectifier member 74 includes a cutout 80 which is cut in a direction away from the oxygen-containing gas supply passage 68 and the fuel gas supply passage 30. Circular arc portions 82 respectively corresponding to the outer shapes of the sandwiching sections 36 are formed on both sides of the flow rectifier member 74.

As shown in FIG. 5, a space L1 between the adjacent flow rectifier members 74 on a side of the joint portions between the sandwiching sections 36 and the first bridges 34 (at the one end 76) is larger than a space L2 between the adjacent flow rectifier members 74 on a side of the circumscribed circle of the separator 28 (at the outer circumferential portion 78) (L1>L2).

As shown in FIGS. 1 and 2, the fuel cell stack 12 includes a first end plate 84a having a substantially circular disk shape at one end in the stacking direction of the fuel cells 10. Further, the fuel cell stack 12 includes a plurality of second end plates 84b and a fixing ring 84c at the other end in the stacking direction of the fuel cells 10, through a partition wall 85. Each of the end plates 84b has a small diameter, and a substantially circular shape, and the fixing ring 84c has a large diameter, and a substantially ring shape. The partition wall 85 prevents diffusion of the exhaust gas to the outside of the fuel cells 10. The number of second end plates 84b is four, corresponding to the positions of stacking the electrolyte electrode assemblies 26.

The first end plate 84a and the fixing ring 84c include a plurality of holes 86. Bolts 88 are inserted into the holes 86 and bolt insertion collar members 87, and screwed into nuts 90. By the bolts 88 and the nuts 90, the first end plate 84a and the fixing ring 84c are fixedly tightened together.

One fuel gas supply pipe 92, a casing 93, and one oxygen-containing gas supply pipe 94 are provided at the first end plate 84a. The fuel gas supply pipe 92 is connected to the fuel gas supply passage 30. The casing 93 has a cavity 93a connected to the respective oxygen-containing gas supply passages 68. The oxygen-containing gas supply pipe 94 is connected to the casing 93, and to the cavity 93a.

A support plate 102 is fixed to the first end plate 84a through a plurality of bolts 88, nuts 98a, 98b, and plate collar members 100. A first load applying unit 104 for applying a tightening load to the fuel gas supply sections 32, 62, and second load applying units 108 for applying a tightening load to each of the electrolyte electrode assemblies 26 are provided between the support plate 102 and the first end plate 84a. The first load applying unit 104 and the second load applying units 108 form a load applying mechanism.

The first load applying unit 104 includes a presser member 110 provided at the center of the fuel cells 10 (centers of the fuel gas supply sections 32, 62) for preventing leakage of the fuel gas from the fuel gas supply passage 30. The presser member 110 is provided near the center of the four second end plates 84b for pressing the fuel cells 10 through the partition wall 85. A first spring 114 is provided at the presser member 110 through a first receiver member 112a and a second receiver member 112b. A tip end of the first presser bolt 116 contacts the second receiver member 112b. The first presser bolt 116 is screwed into a first screw hole 118 formed in the support plate 102. The position of the first presser bolt 116 is adjustable through a first nut 120.

Each of the second load applying units 108 includes a third receiver member 122a at the second end plate 84b, corresponding to each of the electrolyte electrode assemblies 26. The third receiver member 122a is positioned on the second end plate 84b through the pin 124. One end of the second spring 126 contacts the third receiver member 122a and the other end of the second spring 126 contacts the fourth receiver member 122b. A tip end of the second presser bolt 128 contacts the fourth receiver member 122b. The second presser bolt 128 is screwed into the second screw hole 130 formed in the support plate 102. The position of the second presser bolt 128 is adjustable through the second nut 132.

Operation of the fuel cell stack 12 will be described below.

As shown in FIG. 1, the fuel gas is supplied through the fuel gas supply pipe 92 connected to the first end plate 84a. Then, the fuel gas flows into the fuel gas supply passage 30. The air as the oxygen-containing gas is supplied from the oxygen-containing gas supply pipes 94 to each of the oxygen-containing gas supply passages 68 through the cavity 93a.

As shown in FIG. 6, the fuel gas flows along the fuel gas supply passage 30 of the fuel cell stack 12 in the stacking direction indicated by the arrow A. The fuel gas moves through the fuel gas supply channel 66 of each fuel cell 10 along the surface of the separator 28.

The fuel gas flows from the fuel gas supply channel 66 into the fuel gas channel 40 through the fuel gas inlet 38 formed in the sandwiching section 36. The fuel gas inlet 38 is provided at substantially the central position of the anode 24 of each electrolyte electrode assembly 26. Thus, the fuel gas is supplied from the fuel gas inlet 38 to the anode 24, and flows along the fuel gas channel 40 from substantially the central region to the outer circumferential region of the anode 24.

Under the rectifying operation of the flow rectifier member 74, the oxygen-containing gas is supplied to the oxygen-containing gas supply passage 68, and flows into the space between the inner circumferential edge of the electrolyte electrode assembly 26 and the inner circumferential edge of the sandwiching section 36, and flows in the direction indicated by the arrow B toward the oxygen-containing gas channel 54. In the oxygen-containing gas channel 54, the oxygen-containing gas flows from the inner circumferential edge (center of the separator 28) to the outer circumferential edge (outer circumferential edge of the separator 28) of the electrolyte electrode assembly 26.

Thus, in each of the electrolyte electrode assemblies 26, the fuel gas flows from the center to the outer circumferential side on the electrode surface of the anode 24, and the oxygen-containing gas flows in one direction indicated by the arrow B on the electrode surface of the cathode 22. At this time, oxide ions move through the electrolyte 20 toward the anode 24 for generating electricity by electrochemical reactions.

The exhaust gas chiefly containing the air after consumption in the power generation reaction is discharged to the outer circumferential region of each of the electrolyte electrode assemblies 26, and flows through the exhaust gas channels 72 as the off gas, and the off gas is discharged from the fuel cell stack 12 (see FIG. 1).

In the first embodiment, a plurality of, e.g., four electrolyte electrode assemblies 26 are arranged concentrically around the fuel gas supply section 32. In the structure, the fuel gas and the oxygen-containing gas supplied to the fuel cells 10 (fuel cell stack 12) are suitably heated by heat generated by power generation and heat generated by reaction of the remaining fuel gas discharged from the fuel gas discharge channel 42 to the oxygen-containing gas supply passage 68 and the oxygen-containing gas flowing through the oxygen-containing gas supply passage 68. Thus, it is possible to improve the heat efficiency and facilitate the thermally self-sustained operation of the fuel cells 10 (fuel cell stack 12).

Further, the electrolyte electrode assemblies 26 are arranged concentrically around the fuel gas supply section 32. In the structure, the fuel gas can be supplied from the fuel gas supply section 32 equally to the respective electrolyte electrode assemblies 26. Thus, improvement and stability in the power generation performance is achieved in each of the electrolyte electrode assemblies 26.

Further, in the first embodiment, the flow rectifier members 74 are provided between the adjacent sandwiching sections 36 for rectifying the oxygen-containing gas supplied from the oxygen-containing gas supply passage 68 to the electrolyte electrode assemblies 26. Each of the rectifier members 74 has the one end 76 covering part of the sandwiching section 36, and the one end 76 is provided near the joint portions between the sandwiching sections 36 and the first bridges 34. In the structure, the space between the one end 76 and first bridges 34 is narrow, and the oxygen-containing gas is supplied locally to the portion of the electrolyte electrode assemblies 26 where the supply of the oxygen-containing gas is required.

Figure 7:
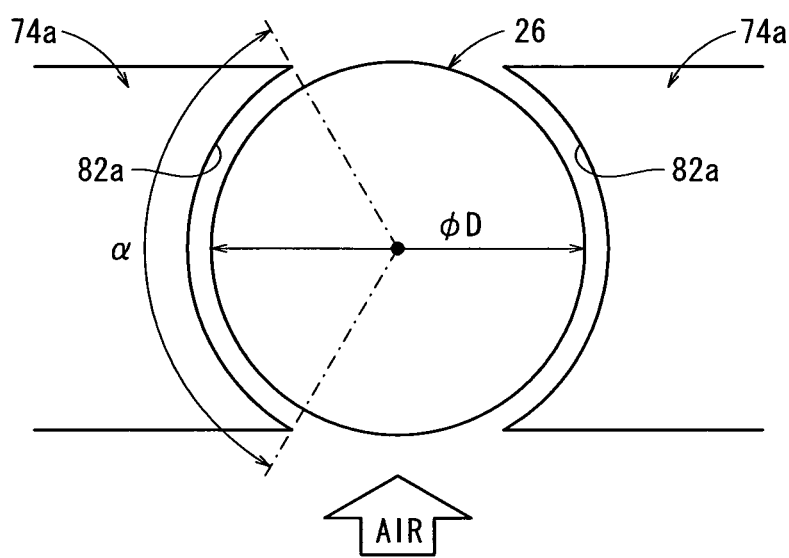
FIG. 7 is a view showing an electrolyte electrode assembly and a circumferential angle of a flow rectifier member.
Figure 8:
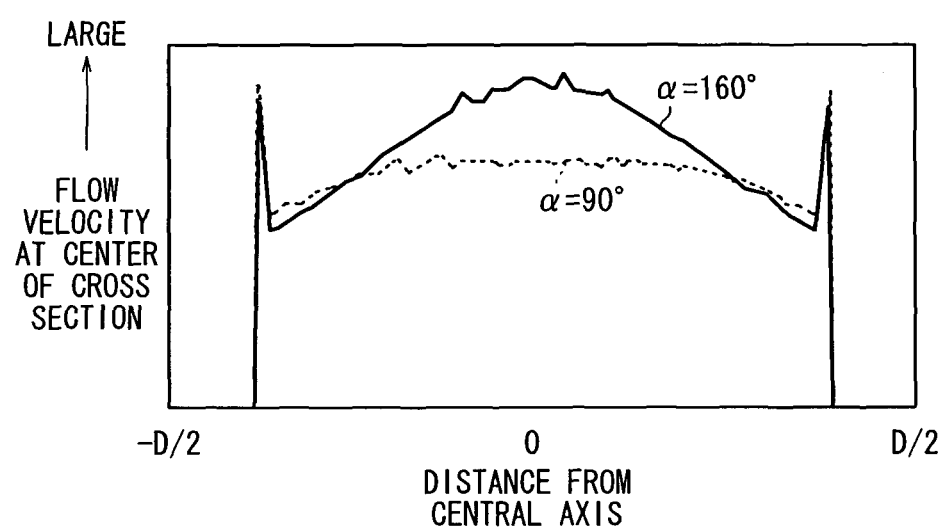
FIG. 8 is a graph showing the relationship between the circumferential angle and the cross-sectional flow velocity of an oxygen-containing gas.

As shown in FIG. 7, an experiment for detecting flow velocity distribution of the oxygen-containing gas on the electrolyte electrode assembly 26 was conducted by changing the angle α of a flow rectifier member 74a covering part of the electrolyte electrode assembly 26. Specifically, the angle α was set to 160° and 90°. The flow velocity distribution of the oxygen-containing gas on the electrolyte electrode assembly 26 is shown in FIG. 8. As can be seen from FIG. 8, as the angle α becomes larger, i.e., as the space between the one ends 76 of the adjacent flow rectifier members 74 and the space between the outer circumferential portions 78 of the adjacent flow rectifier members 74 became narrower, the flow velocity at the center of the electrolyte electrode assembly 26 became larger. As a result, it became possible to regulate the flow rate of the oxygen-containing gas suitably for the flow rate of the fuel gas supplied from the center of the electrolyte electrode assembly 26.

In the first embodiment, the distribution of the oxygen-containing gas supplied to the electrode surface of the cathode 22 is optimized for the distribution of the fuel gas supplied to the electrode surface of the anode 24. Therefore, it is possible to prevent depletion of the oxygen-containing gas, and to lower the ratio of the air to the fuel gas (A/F). Thus, the output of the oxygen-containing gas supply apparatus can be lowered, and the size of the oxygen-containing gas supply apparatus can be reduced. Further, since the flow rectifier member 74 is provided outside the sandwiching section 36, the flow rectifier member 74 does not affect current collection by the sandwiching section 36.

Further, the flow rectifier member 74 is provided along part of the outer circumferential portion of the sandwiching section 36 and part of the circumscribed circle of the separator 28. In the structure, the amount of the oxygen-containing gas flowing from the oxygen-containing gas supply passage 68 to the outside of the sandwiching section 36 is regulated. The flow rectifier member 74 does not protrude from the circumscribed circle of the separator 28. Thus, the overall size of the fuel cell 10 can be reduced easily.

Further, radiation of heat generated in the electrolyte electrode assemblies 26 to the outside of the sandwiching sections 36 is suppressed. Thus, it is possible to improve heat efficiency, and facilitate thermally self-sustained operation.

Further, the space L1 between the adjacent flow rectifier members 74 on the side of the joint portions between the sandwiching sections 36 and the first bridges 34 is larger than a space L2 between the adjacent flow rectifier members 74 on the side of the circumscribed circle of the separator 28. In the structure, it is possible to increase the amount of the oxygen-containing gas locally supplied to the portion of the electrolyte electrode assemblies 26 where the supply of the oxygen-containing gas is required. The pressure of the oxygen-containing gas on the electrolyte electrode assembly 26 is regulated for making it possible to prevent depletion of the oxygen-containing gas.

Further, at the one end 76 of the flow rectifier member 74, the cutout 80 which is cut in the direction away from the oxygen-containing gas supply passage 68 and the fuel gas supply passage 30 is provided. In the structure, the volume of the oxygen-containing gas supply passage 68 extending in the stacking direction becomes large, and reduction in the pressure loss is achieved easily. Further, since the flow rectifier member 74 is made of electrically insulating material, short-circuiting between the separators 28 does not occur.

Further, in the first embodiment, as shown in FIG. 3, the circular arc wall 44 is provided on the surface 36a of the sandwiching section 36 of the separator 28, in the path connecting the fuel gas inlet 38 and the fuel gas discharge channel 42, and the circular arc wall 44 contacts the anode 24 of the electrolyte electrode assembly 26.

In the structure, the fuel gas supplied from the fuel gas inlet 38 to the fuel gas channel 40 is blocked by the circular arc wall 44. Thus, the fuel gas does not flow straight from the fuel gas inlet 38 to the fuel gas discharge channel 42. The fuel gas flows around in the fuel gas channel 40, and the fuel gas flows along the anode 24 over a longer distance. That is, the fuel gas flows along the anode 24 over a longer period of time, and the fuel gas can be consumed effectively in the power generation reaction. Accordingly, the fuel gas utilization ratio is improved effectively.

The protrusion 46 which contacts the outer edge of the anode 24 is provided on the surface 36a of the sandwiching section 36. Therefore, it is possible to prevent oxidation due to the entry of the exhaust gas or the oxygen-containing gas into the anode 24 from the outside of the electrolyte electrode assembly 26. Accordingly, it is possible to prevent the power generation efficiency from being lowered due to oxidation, and improve durability of the separators 28 and the electrolyte electrode assemblies 26.

Further, the projections 48 provided on the sandwiching section 36 protrude on a side of the fuel gas channel 40, and contact the anode 24. By the projections 48, good current collection efficiency is achieved.

The consumed fuel gas supplied to the fuel gas channel 40 is discharged from the fuel gas discharge channel 42 to the oxygen-containing gas supply passage 68. Thus, in the oxygen-containing gas supply passage 68, the fuel gas in the exhaust gas after consumption in the power generation reacts with some of the oxygen-containing gas before consumption in the power generation. As a result, the rest of the oxygen-containing gas before consumption is heated beforehand. Thus, it is possible to supply the previously-heated oxygen-containing gas to the oxygen-containing gas channel 54, and improvement in the heat efficiency is achieved.

Further, the first bridges 34 extend radially outwardly from the fuel gas supply section 32 such that the first bridges 34 are spaced at equal angular intervals. In the structure, the fuel gas can be supplied from the fuel gas supply section 32 equally to the respective electrolyte electrode assemblies 26 through the first bridges 34. Thus, improvement and stability in the power generation performance can be achieved in each of the electrolyte electrode assemblies 26.

Further, in the fuel cell stack 12, the tightening load applied to the fuel gas supply sections 32, 62 by the first load applying unit 104 may be larger than the tightening load applied to the electrolyte electrode assemblies 26 by the second load applying units 108.

In the structure, a relatively large tightening load is applied to the fuel gas supply sections 32, 62 to maintain the desired sealing performance, and a relatively small tightening load is applied to the electrolyte electrode assemblies 26 to prevent damage or the like of the electrolyte electrode assemblies 26. Accordingly, improvement in the current collection performance is achieved advantageously.

Figure 9:
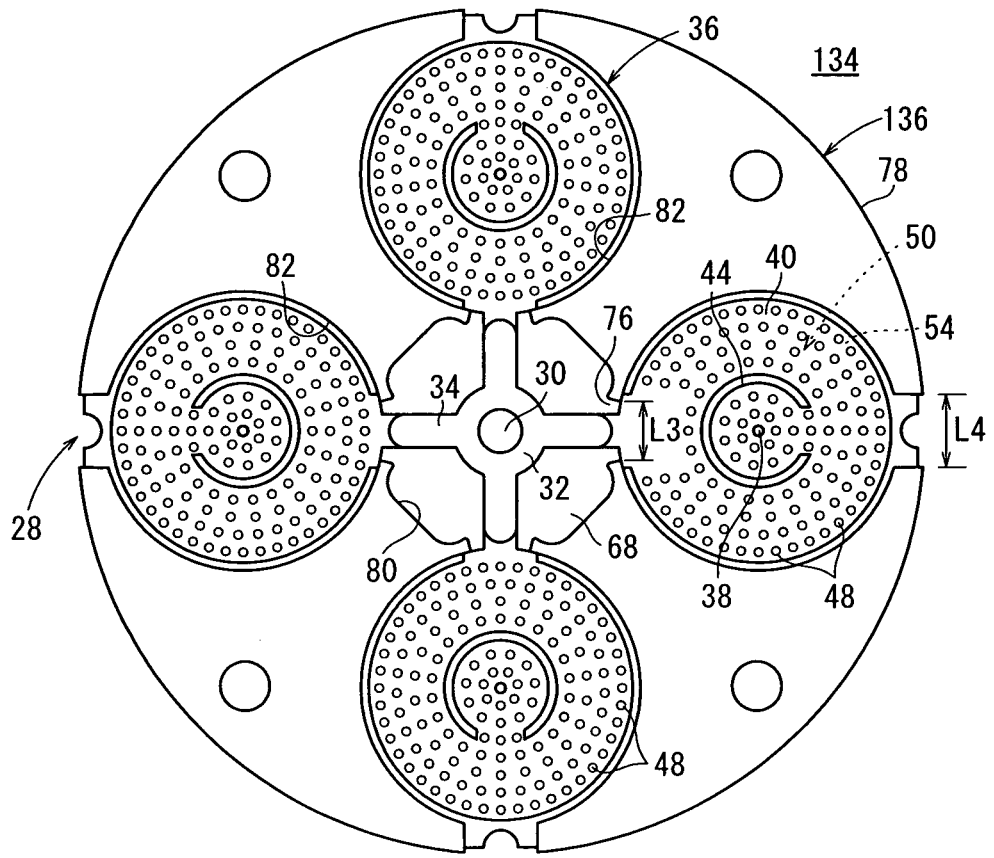
FIG. 9 is a front view showing a fuel cell according to a second embodiment of the present invention.

FIG. 9 is a front view showing a fuel cell 134 according to a second embodiment of the present invention. The constituent elements that are identical to those of the fuel cell 10 according to the first embodiment are labeled with the same reference numeral, and description thereof will be omitted. Further, in third to fifth embodiments as described later, the constituent elements that are identical to those of the fuel cell 10 according to the first embodiment are labeled with the same reference numeral, and detailed description thereof will be omitted.

In the fuel cell 134, a flow rectifier member 136 is provided between the adjacent sandwiching sections 36. The flow rectifier member 136 has a porous structure, e.g., chiefly containing a heat insulating material such as silica glass. The space L3 between the adjacent flow rectifier members 136 on the side of the joint portions between the sandwiching sections 36 and the first bridges 34 is smaller than the space L4 between the adjacent flow rectifier members 136 on the side of the circumscribed circle of the separator 28.

In the second embodiment, the flow rectifier member 136 is made of heat insulating material. Therefore, radiation of heat generated in the electrolyte electrode assemblies 26 to the outside of the sandwiching sections 36 is suppressed. Thus, it is possible to improve heat efficiency easily.

Further, the space L3 between the adjacent flow rectifier members 136 near the oxygen-containing gas inlet of the electrolyte electrode assembly 26 is smaller than the space L4 between the adjacent flow rectifier members 136 near the oxygen-containing gas outlet of the electrolyte electrode assembly 26. In the structure, the oxygen-containing gas flows smoothly on the electrolyte electrode assembly 26, and the pressure loss is reduced effectively.

In the second embodiment, the flow rectifier member 136 is made of heat insulating material. Alternatively, the flow rectifier member 136 may be made of electrically insulating material, and the flow rectifier member 74 may be made of heat insulating material.

Figure 10:
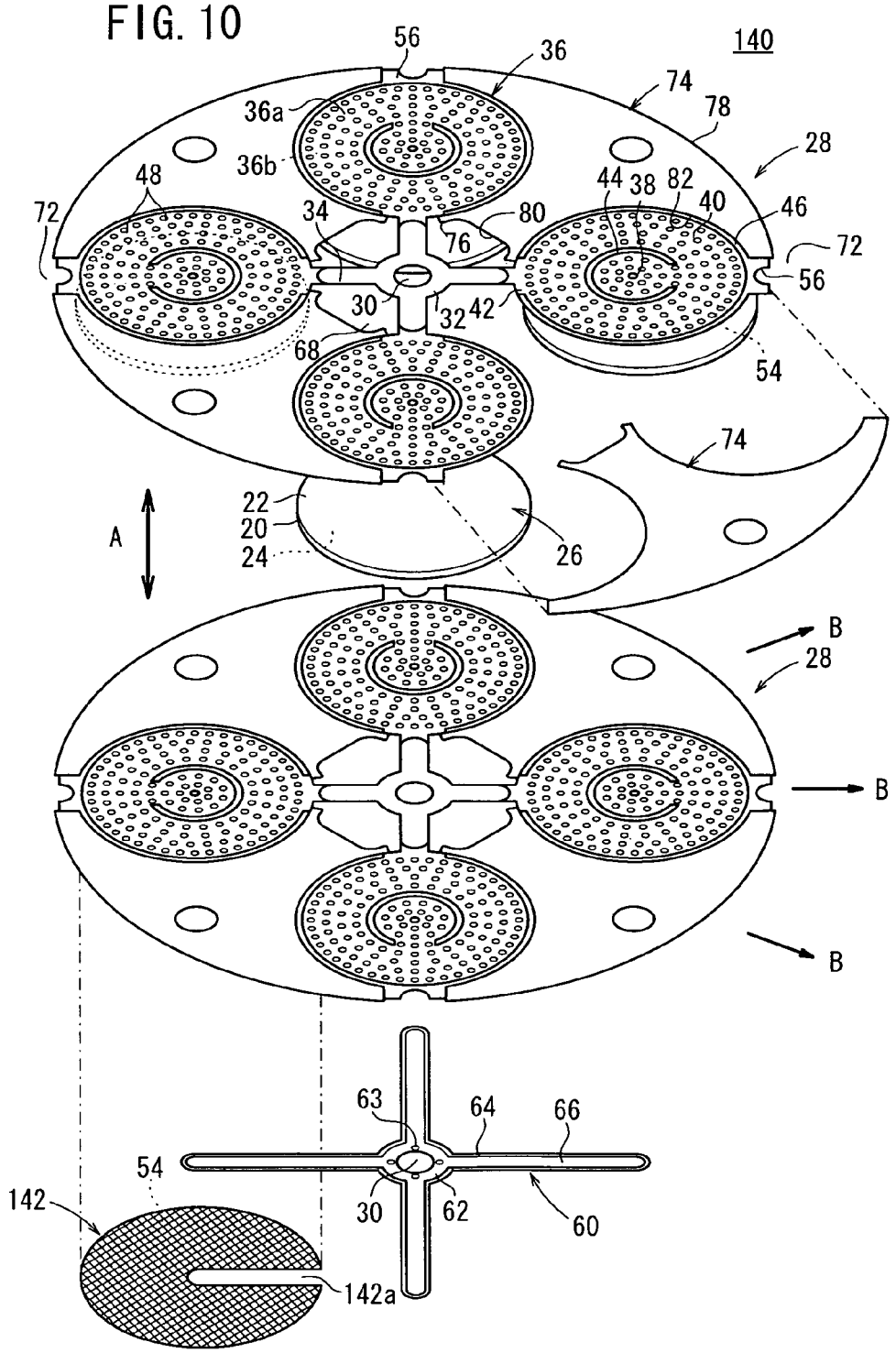
FIG. 10 is an exploded perspective view showing a fuel cell according to a third embodiment of the present invention.

FIG. 10 is an exploded perspective view showing a fuel cell 140 according to a third embodiment of the present invention.

Figure 11:
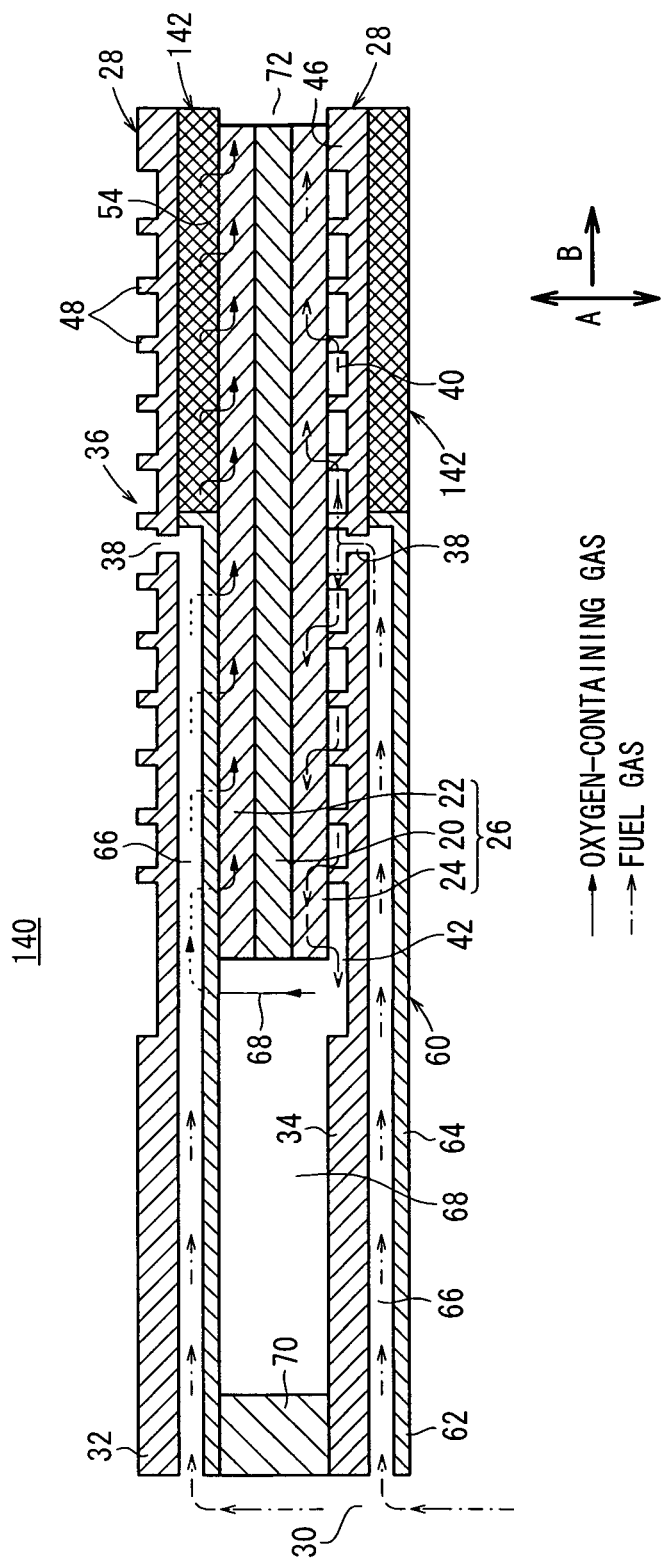
FIG. 11 is a cross sectional view schematically showing operation of the fuel cell.

The fuel cell 140 includes separators 28, and a mesh member (electrically conductive woven fabric such as metal mesh) 142 instead of the plate 50 is provided on the surface 36b of each of the sandwiching sections 36 of the separators 28 (see FIGS. 10 and 11). An oxygen-containing gas channel 54 is formed in the mesh member 142. A cutout 142a is formed in the mesh member 142 as a space for providing the second bridge 64 of the channel member 60.

In the third embodiment, the same advantages as in the case of the first and second embodiments are obtained. Though the mesh member 142 is used in the third embodiment, instead of the mesh member 142, for example, an electrically conductive felt member (electrically conductive non-woven fabric such as metal felt), foam metal, expanded metal, punching metal, or pressed embossed metal may be used.

Figure 12:
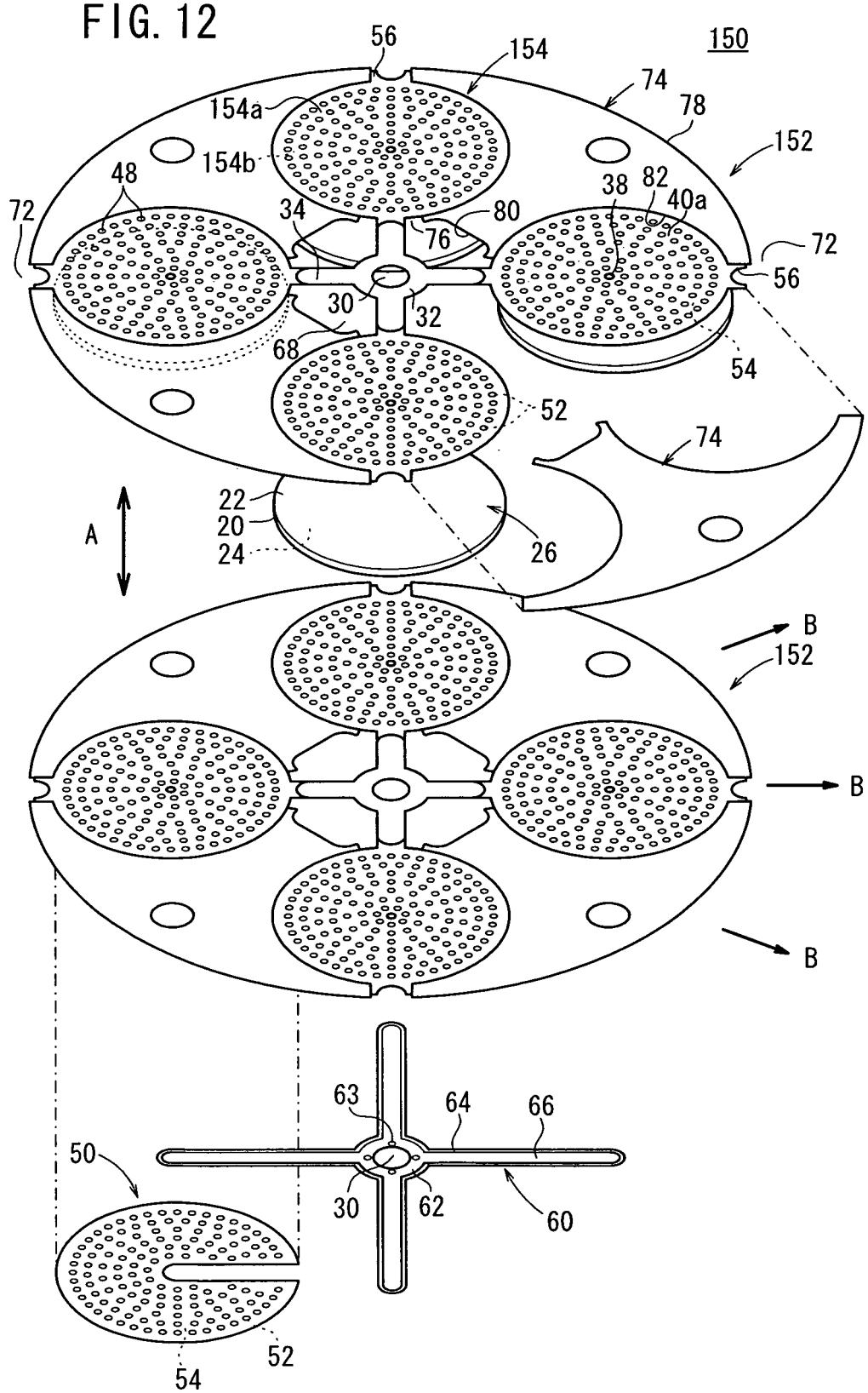
FIG. 12 is an exploded perspective view showing a fuel cell according to a fourth embodiment.
Figure 13:
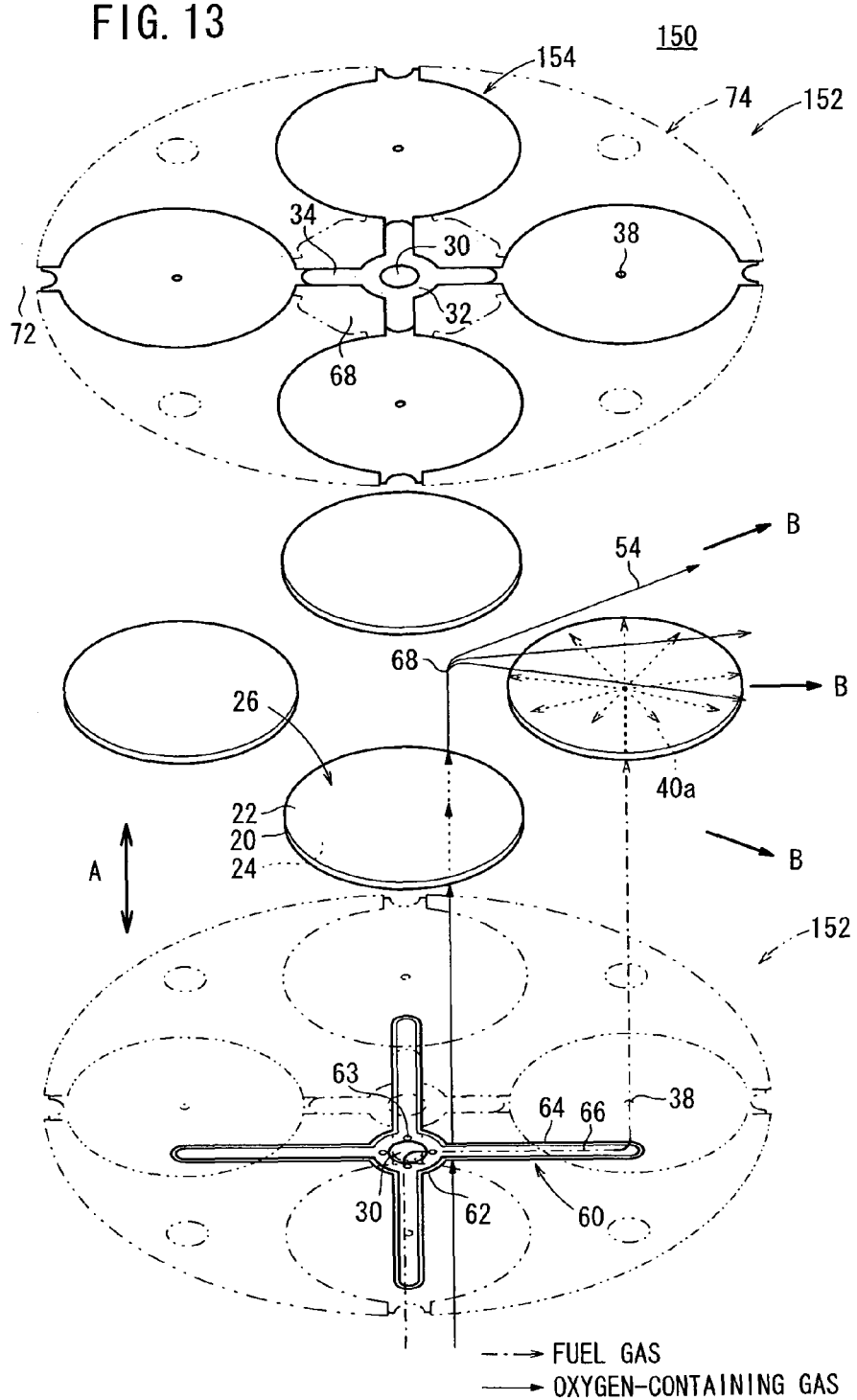
FIG. 13 is a partial exploded perspective view showing gas flows in the fuel cell.

FIG. 12 is an exploded perspective view showing a fuel cell 150 according to a fourth embodiment of the present invention. FIG. 13 is a partial exploded perspective view showing gas flows in the fuel cell 150.

The fuel cell 150 includes separators 152, and each of the separators 152 includes a fuel gas supply section 32, four first bridges 34, and sandwiching sections 154 formed integrally with the respective first bridges 34.

A fuel gas channel 40a for supplying the fuel gas along the electrode surface of the anode 24 is formed on a surface 154a of each sandwiching section 154 facing the anode 24. The circular arc wall 44 and the protrusion 46 according to the first embodiment are not formed on the surface 154a.

Figure 14:
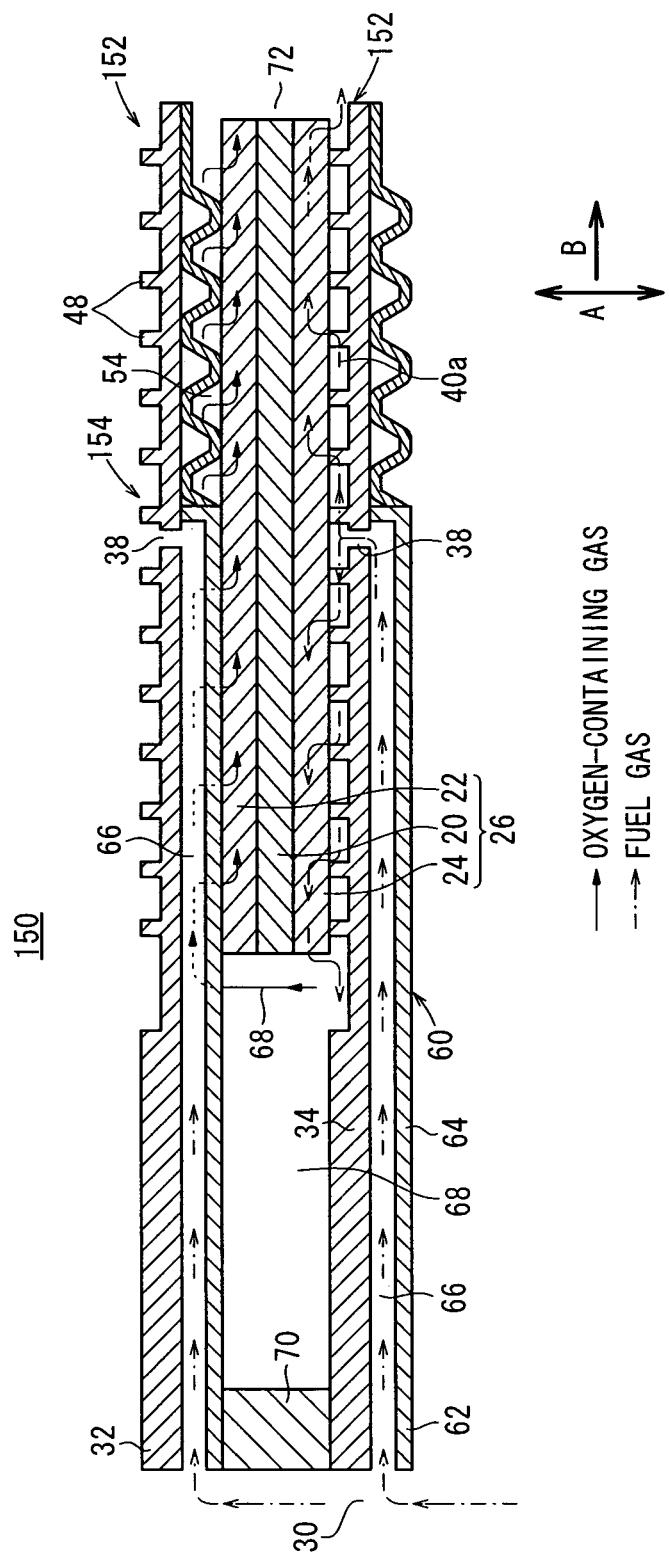
FIG. 14 is a cross sectional view schematically showing operation of the fuel cell.

An oxygen-containing gas channel 54 is formed on a surface 154b opposite to the surface 154a of each sandwiching section 154, using the plate 50 (shown in FIG. 14). Instead of the plate 50, the mesh member 142, an electrically conductive felt member (not shown), or the like may be used.

In the fourth embodiment, the fuel gas supplied to the fuel gas supply passage 30 flows through the fuel gas supply channel 66 of the fuel cell 150, and flows along the surface of the separator 152.

The fuel gas from the fuel gas supply channel 66 flows through the fuel gas inlet 38 formed in the sandwiching section 154, and flows into the fuel gas channel 40a. In the structure, the fuel gas is supplied from the fuel gas inlet 38 to substantially the central region of the anode 24. The fuel gas flows along the fuel gas channel 40 from the substantially central region to the outer circumferential region of the anode 24 (see FIGS. 13 and 14).

The air supplied to the oxygen-containing gas supply passage 68 flows toward the oxygen-containing gas channel 54. In the oxygen-containing gas channel 54, the air flows from the inner circumferential edge to the outer circumferential edge of the cathode 22 (see FIGS. 13 and 14). Thus, in each of the electrolyte electrode assemblies 26, the fuel gas flows from the center to the outer circumferential side on the electrode surface of the anode 24, and the oxygen-containing gas flows in one direction on the electrode surface of the cathode 22. By electrochemical reactions of the air and the fuel gas, electricity is generated.

In the fourth embodiment, the same advantages as in the cases of the first to third embodiments are obtained.

Figure 15:
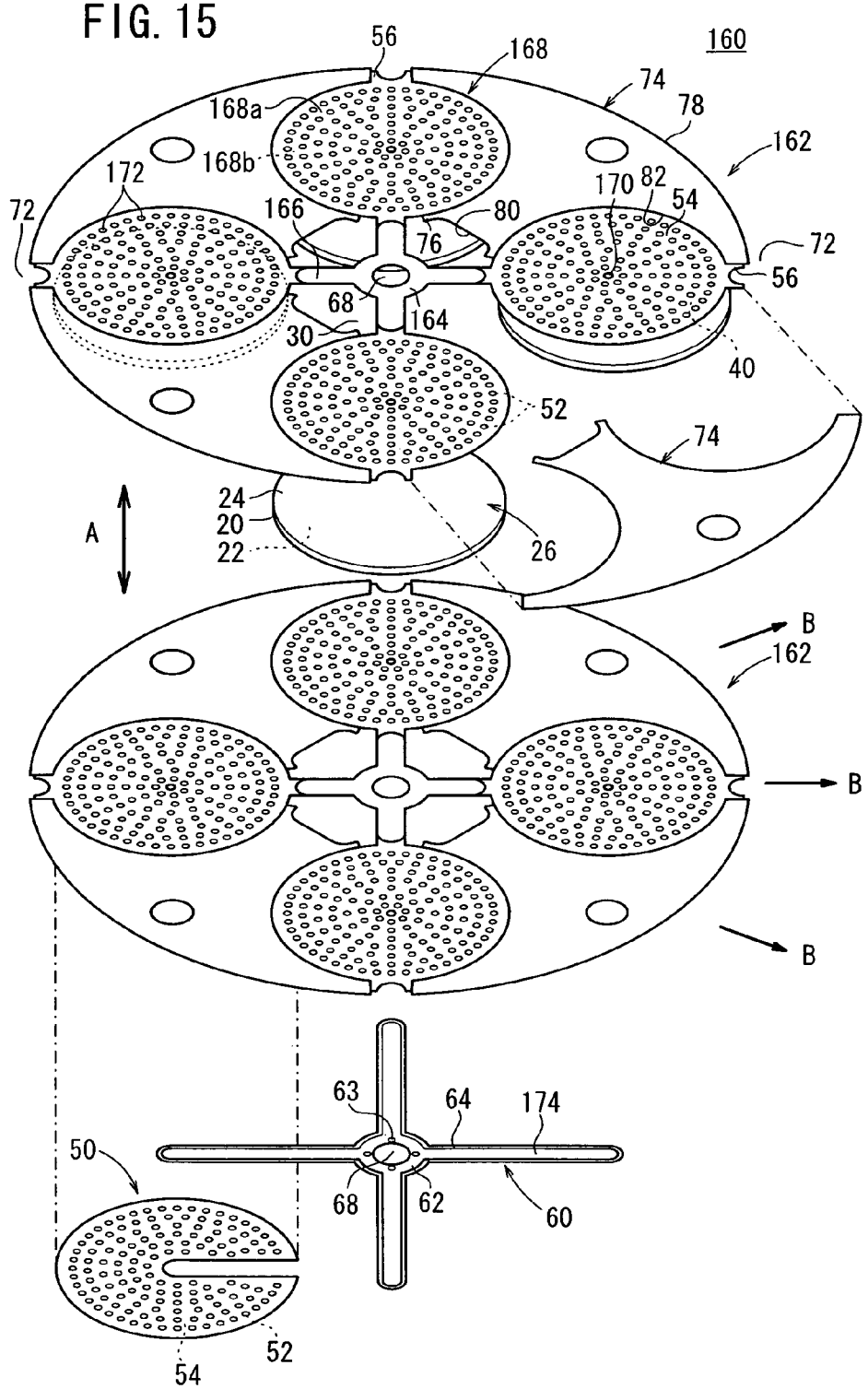
FIG. 15 is an exploded perspective view showing a fuel cell according to a fifth embodiment of the present invention.
Figure 16:
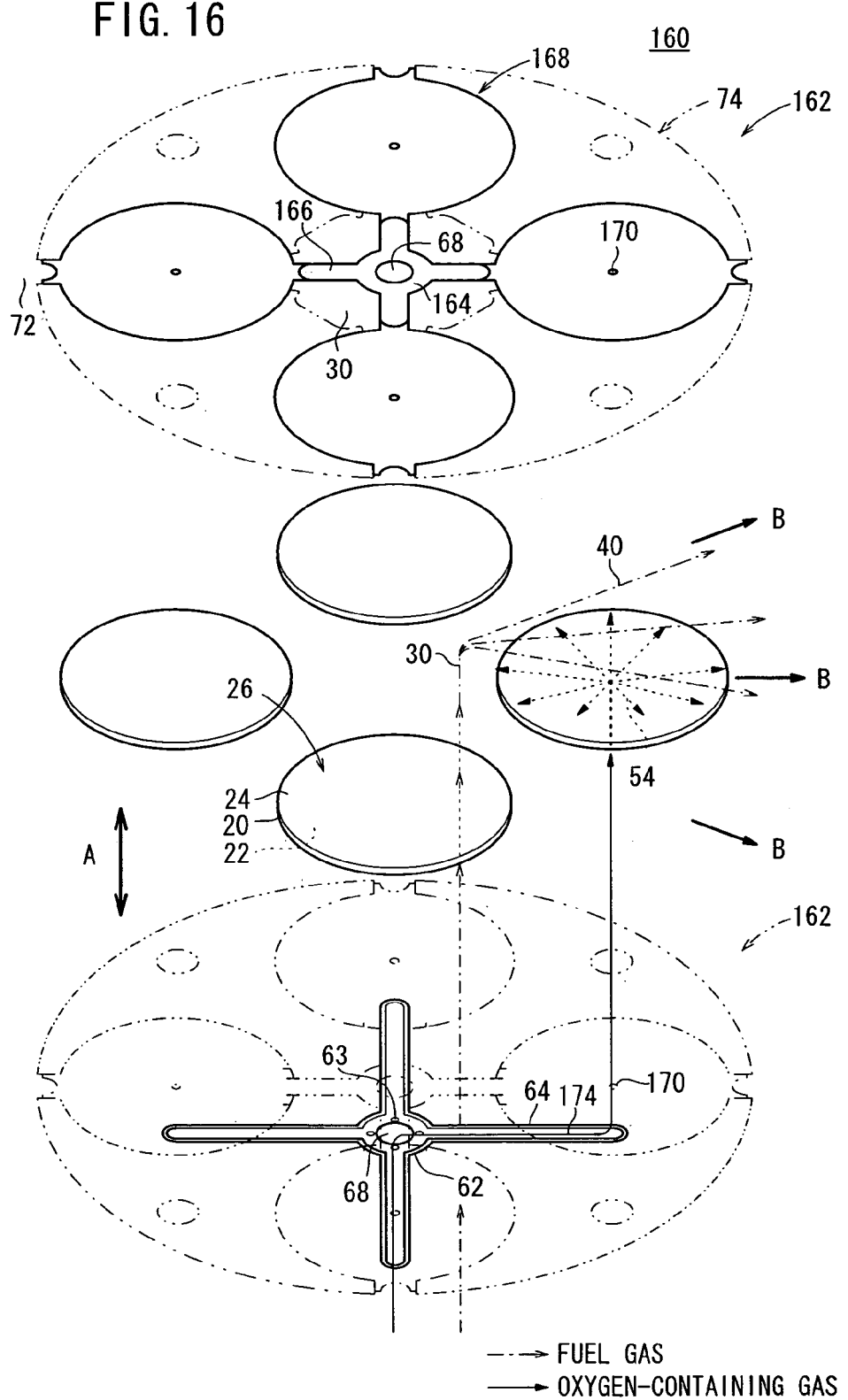
FIG. 16 is a partial exploded view showing gas flows in the fuel cell.

FIG. 15 is an exploded perspective view showing a fuel cell 160 according to a fifth embodiment of the present invention. FIG. 16 is a partial exploded perspective view showing gas flows in the fuel cell 160.

The fuel cell 160 includes separators 162, and an oxygen-containing gas supply section (first reactant gas supply section) 164 is formed at the center of each of the separators 162. An oxygen-containing gas supply passage 68 extends through the oxygen-containing gas supply section 164. Four first bridges 166 extend radially outwardly from the oxygen-containing gas supply section 164 at predetermined angular intervals, e.g., at intervals of 90°. The oxygen-containing gas supply section 164 is integral with the sandwiching sections 168 through the first bridges 166.

An oxygen-containing gas inlet 170 for supplying the oxygen-containing gas is provided, e.g., at the center of the sandwiching section 168, or at a position deviated toward the upstream side from the center of the sandwiching section 168 in the flow direction of the fuel gas.

Each of the sandwiching sections 168 has an oxygen-containing gas channel 54 on a surface 168a which contacts the cathode 22. The oxygen-containing gas channel 54 is formed by a plurality of projections 172 on the surface 168a of each of the sandwiching sections 168. Each of the sandwiching sections 168 has a fuel gas channel 40 on a surface 168b which contacts the anode 24. An oxygen-containing gas supply channel (reactant gas supply channel) 174 connecting the oxygen-containing gas supply passage 68 to an oxygen-containing gas inlet 170 is formed between the first bridge 166 and a second bridge 64 of a channel member 60.

The flow rectifier member 74 (or the flow rectifier member 136) for rectifying the flow of the fuel gas supplied from the fuel gas supply passage (second reactant gas supply section) 30 to the electrolyte electrode assembly 26 is provided between the adjacent sandwiching sections 168.

In the fifth embodiment, after the oxygen-containing gas is supplied to the oxygen-containing gas supply passage 68 provided at the center of the fuel cell 160, the oxygen-containing gas flows through the oxygen-containing gas supply channel 174 along the surface of the separator 162. Then, the oxygen-containing gas is supplied to the central region of the cathode 22 from the oxygen-containing gas inlet 170 formed at the center, or at a position near the center of the sandwiching section 168, and the oxygen-containing gas flows from the central region to the outer circumferential region of the cathode 22.

Figure 17:
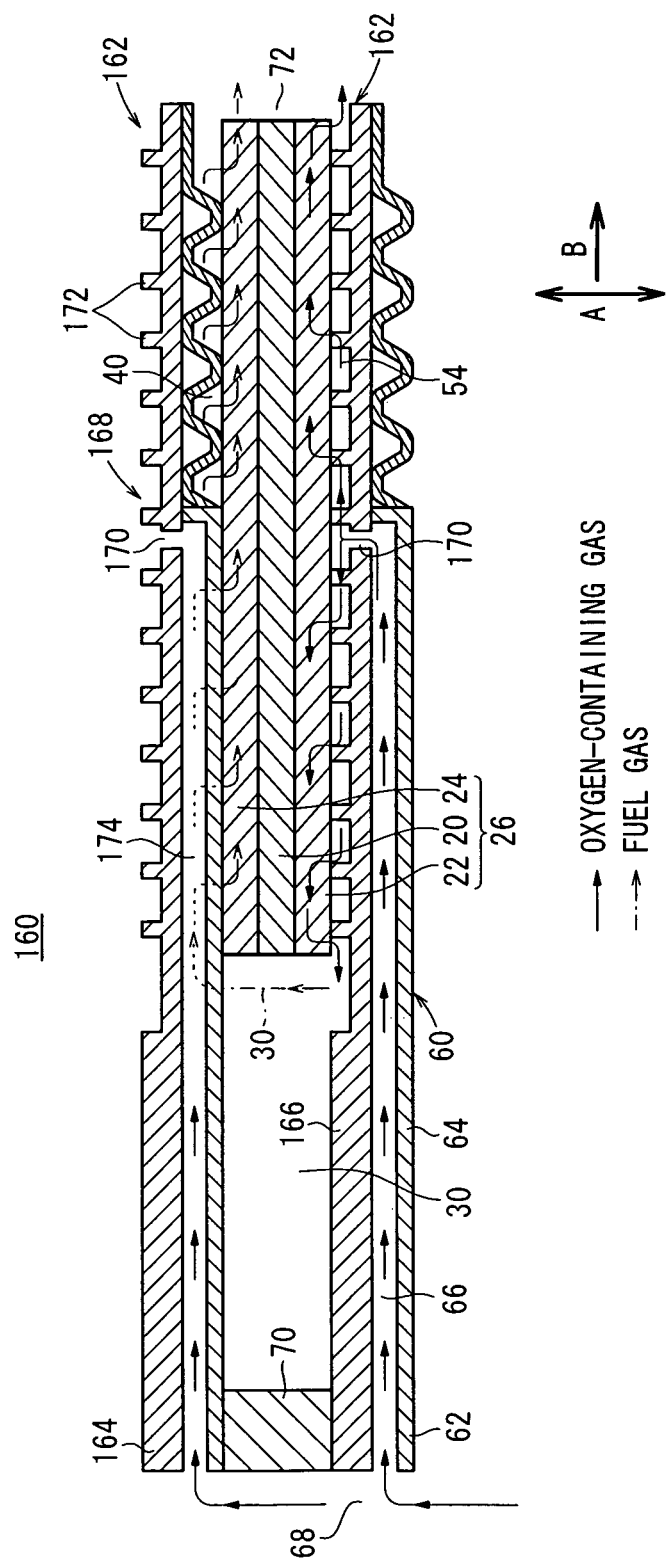
FIG. 17 is a cross sectional view schematically showing operation of the fuel cell.
Figure 18:
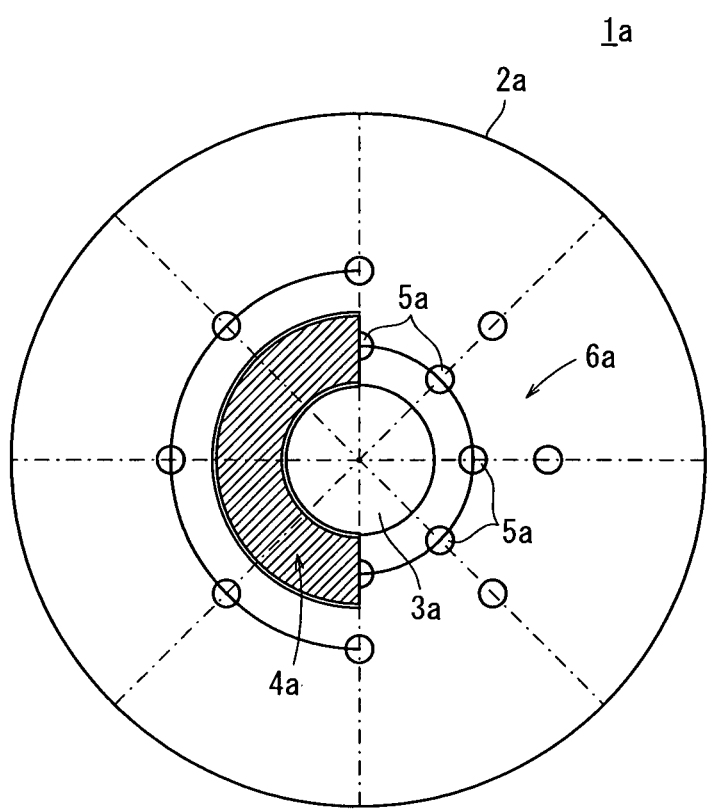
FIG. 18 is a view showing a cell forming plate of a fuel cell disclosed in Japanese Laid-Open Patent Publication No. 2004-235060.
Figure 19:
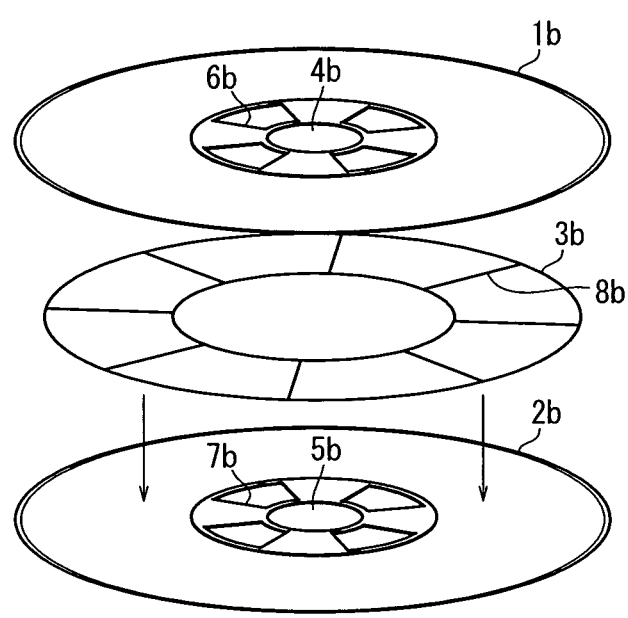
FIG. 19 is an exploded perspective view showing operation of a solid oxide fuel cell disclosed in Japanese Laid-Open Patent Publication No. 2006-302749.

Under the flow rectifying operation of the flow rectifier member 74, the fuel gas supplied to the fuel gas supply passage 30 flows into the space between the inner circumferential edge of the electrolyte electrode assembly 26 and the inner circumferential edge of the sandwiching section 168, and flows in the direction indicated by the arrow B toward the fuel gas channel 40 (see FIG. 17). In the fuel gas channel 40, the fuel gas flows from the inner circumferential edge to the outer circumferential edge of, i.e., from one end to the other end of the anode 24 of the electrolyte electrode assembly 26 in the direction indicated by the arrow B. The air is supplied from the center to the outer circumferential side on the electrode surface of the cathode 22 (see FIG. 16).

In the fifth embodiment, the flow rectifier member 74 is provided between the adjacent sandwiching sections 168 for rectifying the flow of the fuel gas supplied to the electrolyte electrode assembly 26 through the fuel gas supply passage 30.

In the structure, the same advantages as in the cases of the first to fourth embodiments are obtained. For example, the fuel gas is locally supplied to the portion of the electrolyte electrode assemblies 26 where the supply of the fuel gas is required. The distribution of the oxygen-containing gas supplied to the electrode surface of the cathode 22 is optimized for the distribution of the fuel gas supplied to the electrode surface of the anode 24.

In the first to fifth embodiments, four electrolyte electrode assemblies are arranged concentrically in a plan view. However, the present invention is not limited in this respect. Alternatively, an arbitral number of, e.g., two or more electrolyte electrode assemblies 26 may be arranged concentrically.

Further, the oxygen-containing gas supply passage 68 extends in the stacking direction indicated by the arrow A inside the sandwiching sections 36, and between the first bridges 34. However, the present invention is not limited in this respect. For example, the oxygen-containing gas supply passage 68 extends in the stacking direction on the extension 56 side shown in FIG. 3.

In the structure, the oxygen-containing gas flows from the outer circumferential side to the central side of the separator 28. That is, though the oxygen-containing gas flows from the central side to the outer circumferential side of the separator 28 in FIG. 3, in a modified embodiment, the oxygen-containing gas may flow from the outer circumferential side to the central side of the separator 28.

While the invention has been particularly shown and described with reference to preferred embodiments, it will be understood that variations and modifications can be effected thereto by those skilled in the art without departing from the spirit and scope of the invention as defined by the appended claims.

The invention claimed is:

1. A fuel cell formed by stacking electrolyte electrode assemblies between separators, the electrolyte electrode assemblies each including an anode, a cathode, and an electrolyte interposed between the anode and the cathode, the separators each comprising:

sandwiching sections sandwiching the electrolyte electrode assemblies, the sandwiching sections each having a fuel gas channel for supplying a fuel gas along an electrode surface of the anode and an oxygen-containing gas channel for supplying an oxygen-containing gas along an electrode surface of the cathode separately;

bridges connected to the sandwiching sections, the bridges each having a reactant gas supply channel for supplying the fuel gas to the fuel gas channel or supplying the oxygen-containing gas to the oxygen-containing gas channel; and a first reactant gas supply section connected to the bridges, a reactant gas supply passage extending through the first reactant gas supply section in a stacking direction for supplying the fuel gas or the oxygen-containing gas to the reactant gas supply channel, the first reactant gas supply section being provided at the center of the separator;

a second reactant gas supply section for allowing the oxygen-containing gas or the fuel gas to flow in the stacking direction, and supplying the oxygen-containing gas to the oxygen-containing gas channel or supplying the fuel gas to the fuel gas channel; and a flow rectifier member to channel fluid flow provided between adjacent sandwiching sections, for rectifying the flow of the oxygen-containing gas flowing through the oxygen-containing gas channel or the fuel gas flowing through the fuel gas channel, along a surface of the electrolyte electrode assembly from at least the second reactant gas supply section, wherein the electrolyte electrode assemblies are arranged concentrically around the first reactant gas supply section, and the flow rectifier member is provided along part of an outer circumferential portion of the sandwiching section and part of a circumscribed circle of the separator, and wherein one end of the flow rectifier member along part of the sandwiching section is provided near joint portions between the sandwiching sections and the bridges, along a surface of each of the separators, and wherein the flow rectifier member is made of electrically insulating material.

2. A fuel cell according to claim 1, wherein a space between the adjacent flow rectifier members on a side of the joint portions between the sandwiching sections and the bridges is larger than a space between the adjacent flow rectifier members on a side of the circumscribed circle of the separator.

3. A fuel cell according to claim 1, wherein a space between the adjacent flow rectifier members on a side of the joint portions between the sandwiching sections and the bridges is smaller than a space between the adjacent flow rectifier members on a side of the circumscribed circle of the separator.

4. A fuel cell according to claim 1, wherein the flow rectifier member has a cutout in a direction away from the first reactant gas supply section, at one end thereof on a side of the first reactant gas supply section.

5. A fuel cell according to claim 1, wherein the flow rectifier member is made of a heat and electrically insulating material.

6. A fuel cell according to claim 1, wherein the bridges extend radially outwardly from the first reactant gas supply section, and are spaced from each other at equal angular intervals.

7. A fuel cell according to claim 1, wherein the number of the sandwiching sections, and the number of the bridges correspond to the number of the electrolyte electrode assemblies.

8. A fuel cell according to claim 1, wherein the sandwiching section includes:
a fuel gas inlet for supplying the fuel gas to the fuel gas channel;
a fuel gas discharge channel for discharging the fuel gas after consumption in the fuel gas channel; and
a detour channel forming wall contacting the anode, the detour channel forming wall preventing the fuel gas from flowing straight from the fuel gas inlet to the fuel gas discharge channel.

9. A fuel cell according to claim 1, wherein the sandwiching section includes a circumferential protrusion protruding on a side of the fuel gas channel, and contacting an outer edge of the anode.

10. A fuel cell according to claim 1, wherein the sandwiching section includes projections protruding on a side of the fuel gas channel to contact the anode.

11. A fuel cell according to claim 1, wherein the fuel cell is a solid oxide fuel cell.

12. A fuel cell stack formed by stacking a plurality of fuel cells in a stacking direction, the fuel cells each formed by stacking electrolyte electrode assemblies between separators, the electrolyte electrode assemblies each including an anode, a cathode, and an electrolyte interposed between the anode and the cathode, the separators each comprising:
sandwiching sections sandwiching the electrolyte electrode assemblies, the sandwiching sections each having a fuel gas channel for supplying a fuel gas along an electrode surface of the anode and an oxygen-containing gas channel for supplying an oxygen-containing gas along an electrode surface of the cathode separately;
bridges connected to the sandwiching sections, the bridges each having a reactant gas supply channel for supplying the fuel gas to the fuel gas channel or supplying the oxygen-containing gas to the oxygen-containing gas channel; and
a first reactant gas supply section connected to the bridges, a reactant gas supply passage extending through the first reactant gas supply section in the stacking direction for supplying the fuel gas or the oxygen-containing gas to the reactant gas supply channel, the first reactant gas supply section being provided at the center of the separator;
a second reactant gas supply section for allowing the oxygen-containing gas or the fuel gas to flow in the stacking direction, and supplying the oxygen-containing gas to the oxygen-containing gas channel or supplying the fuel gas to the fuel gas channel; and
a flow rectifier member provided between adjacent sandwiching sections, for rectifying the flow of the oxygen-containing gas flowing through the oxygen-containing gas channel or the fuel gas flowing through the fuel gas channel, along a surface of the electrolyte electrode assembly from at least the second reactant gas supply section, wherein the electrolyte electrode assemblies are arranged concentrically around the first reactant gas supply section, and the flow rectifier member is provided along part of an outer circumferential portion of the sandwiching section and part of a circumscribed circle of the separator, and wherein one end of the flow rectifier member along part of the sandwiching section is provided near joint portions between the sandwiching sections and the bridges, along a surface of each of the separators, and wherein the flow rectifier member is made of electrically insulating material.

13. A fuel cell stack according to claim 12, further comprising a load applying mechanism for applying a load to the fuel cells in the stacking direction, wherein the load applying mechanism is configured such that a load applied to a position near the first reactant gas supply section becomes larger than a load applied to the electrolyte electrode assemblies.

14. A fuel cell stack according to claim 12, wherein the fuel cell is a solid oxide fuel cell.

* * * * *